(12) United States Patent
Van Zutphen et al.

(10) Patent No.: US 11,013,368 B2
(45) Date of Patent: *May 25, 2021

(54) RADIATION GRILL

(71) Applicant: KONINKLIJKE PHILIPS N.V., Eindhoven (NL)

(72) Inventors: Martijn Van Zutphen, Marum (NL); Sipke Theo Douma, Haren (NL); Timotheus Johannes Maria Van Aken, Emmen (NL); Reindert Jannes Van Wifferen, Zwolle (NL); Petrus Johannes Bremer, Drachten (NL); Ingrid Hietbrink, Karnten (NL); Manel Josefien Leuverink, Groningen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/295,317

(22) Filed: Mar. 7, 2019

(65) Prior Publication Data

US 2019/0200805 A1    Jul. 4, 2019

Related U.S. Application Data

(63) Continuation of application No. 15/024,059, filed as application No. PCT/EP2014/070302 on Sep. 24, 2014.

(30) Foreign Application Priority Data

Sep. 24, 2013    (EP) .................................... 13185733

(51) Int. Cl.
*A47J 37/07*    (2006.01)
*A47J 37/06*    (2006.01)

(52) U.S. Cl.
CPC ....... *A47J 37/0709* (2013.01); *A47J 37/0786* (2013.01); *A47J 37/0635* (2013.01)

(58) Field of Classification Search
CPC .... A47J 37/07; A47J 37/0709; A47J 37/0623; A47J 37/0629; A47J 37/0635; A47J 37/0641
See application file for complete search history.

(56) References Cited

U.S. PATENT DOCUMENTS

| | | | | | |
|---|---|---|---|---|---|
| 2,860,225 | A | * | 11/1958 | Steen | ........................ F24C 7/04 99/389 |
| 3,154,004 | A | * | 10/1964 | Huck | .................. A47J 37/0807 99/390 |

(Continued)

FOREIGN PATENT DOCUMENTS

| EP | 1444939 A1 | 8/2004 |
|---|---|---|
| EP | 1444942 A1 | 8/2004 |

(Continued)

*Primary Examiner* — Erik Kashnikow
*Assistant Examiner* — Lela S. Williams

(57) ABSTRACT

A radiation grill unit (1) comprises (i) a food support unit (100), (ii) a radiation unit (200) that includes a reflector (210) (with reflector opening (223)) hosting an IR radiation heater (220), wherein the radiation unit (200) is configured to provide IR radiation (201) in a direction of the food support unit (100), and (iii) a radiation grill unit cavity (3) configured to host a drip tray (300). The reflector comprises (i) an upper part having a parabolic shape with an upper part edge and (ii) a lower part with a lower part edge, wherein the lower part includes (a) only one face, (b) two faces, or (c) more than two faces, wherein each face includes a straight segment shape.

19 Claims, 22 Drawing Sheets

(56) References Cited

U.S. PATENT DOCUMENTS

| | | | | |
|---|---|---|---|---|
| 4,350,871 A | * | 9/1982 | Davis, Sr. | F24H 3/002 |
| | | | | 219/511 |
| 4,441,015 A | * | 4/1984 | Eichelberger | A47J 37/0635 |
| | | | | 219/401 |
| 5,181,455 A | | 1/1993 | Masel | |
| 6,959,704 B2 | | 11/2005 | Han | |
| 7,174,885 B2 | | 2/2007 | Han | |
| 8,929,724 B1 | * | 1/2015 | Mograbi | A21B 2/00 |
| | | | | 219/405 |
| 2008/0029503 A1 | | 2/2008 | Cavada | |
| 2008/0314891 A1 | | 12/2008 | Takita | |
| 2010/0212515 A1 | | 8/2010 | Coutts | |
| 2012/0251698 A1 | | 10/2012 | Dennis | |

FOREIGN PATENT DOCUMENTS

| | | |
|---|---|---|
| EP | 1680995 A1 | 7/2006 |
| JP | 06154100 A | 6/1994 |
| JP | 3075899 U | 3/2001 |
| JP | 2003130367 A | 5/2003 |
| WO | 0237030 A1 | 5/2002 |
| WO | 2003078898 A1 | 9/2003 |
| WO | 2007102206 A1 | 9/2007 |
| WO | 2008107556 A1 | 9/2008 |

\* cited by examiner

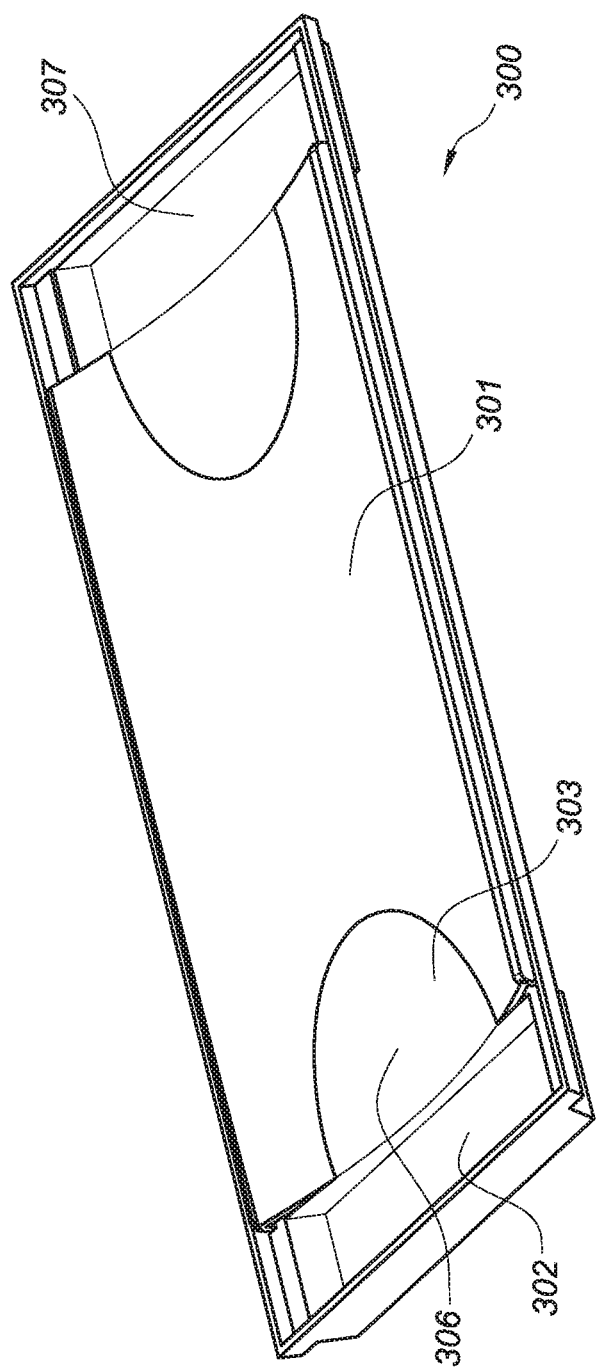

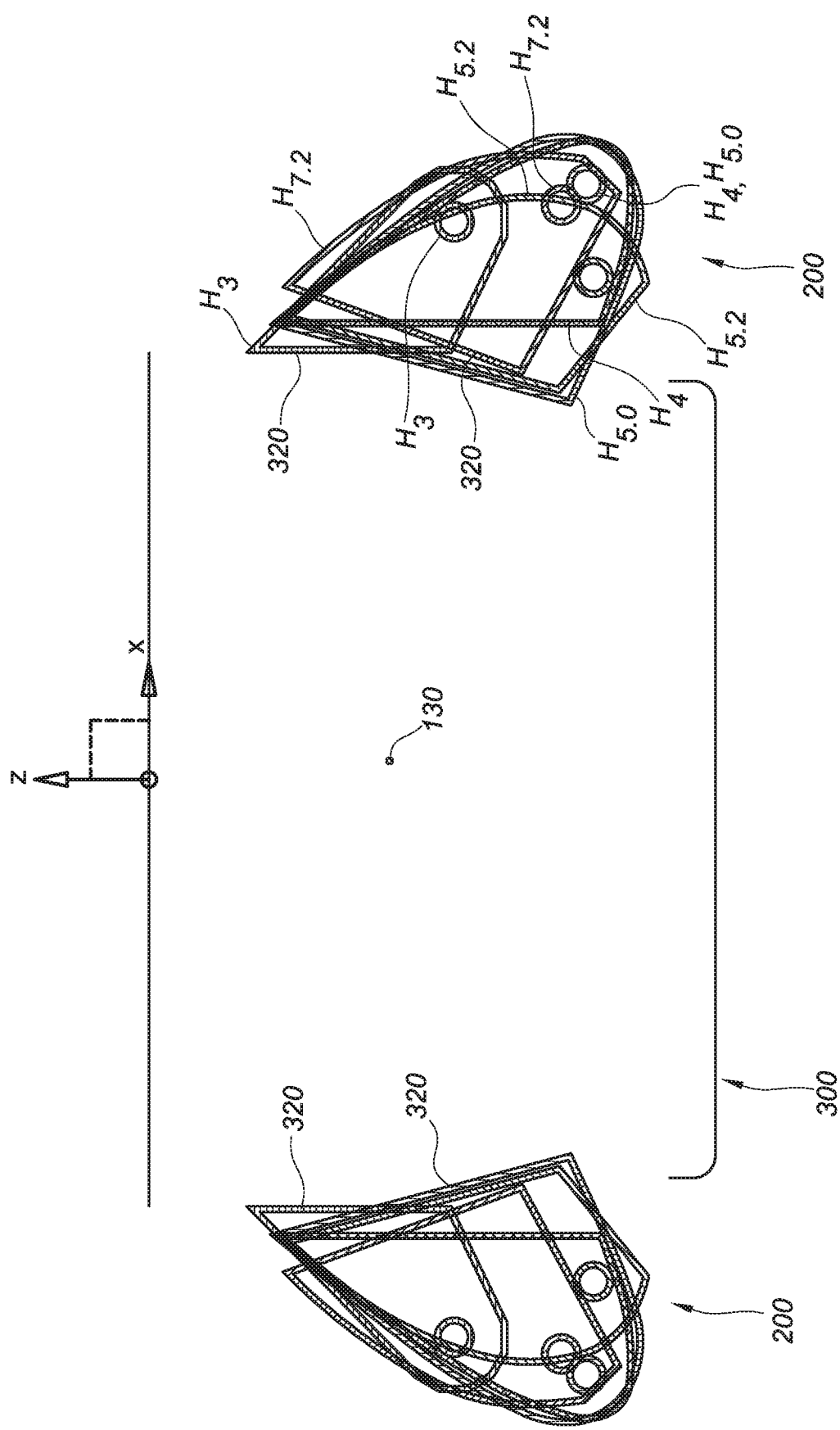

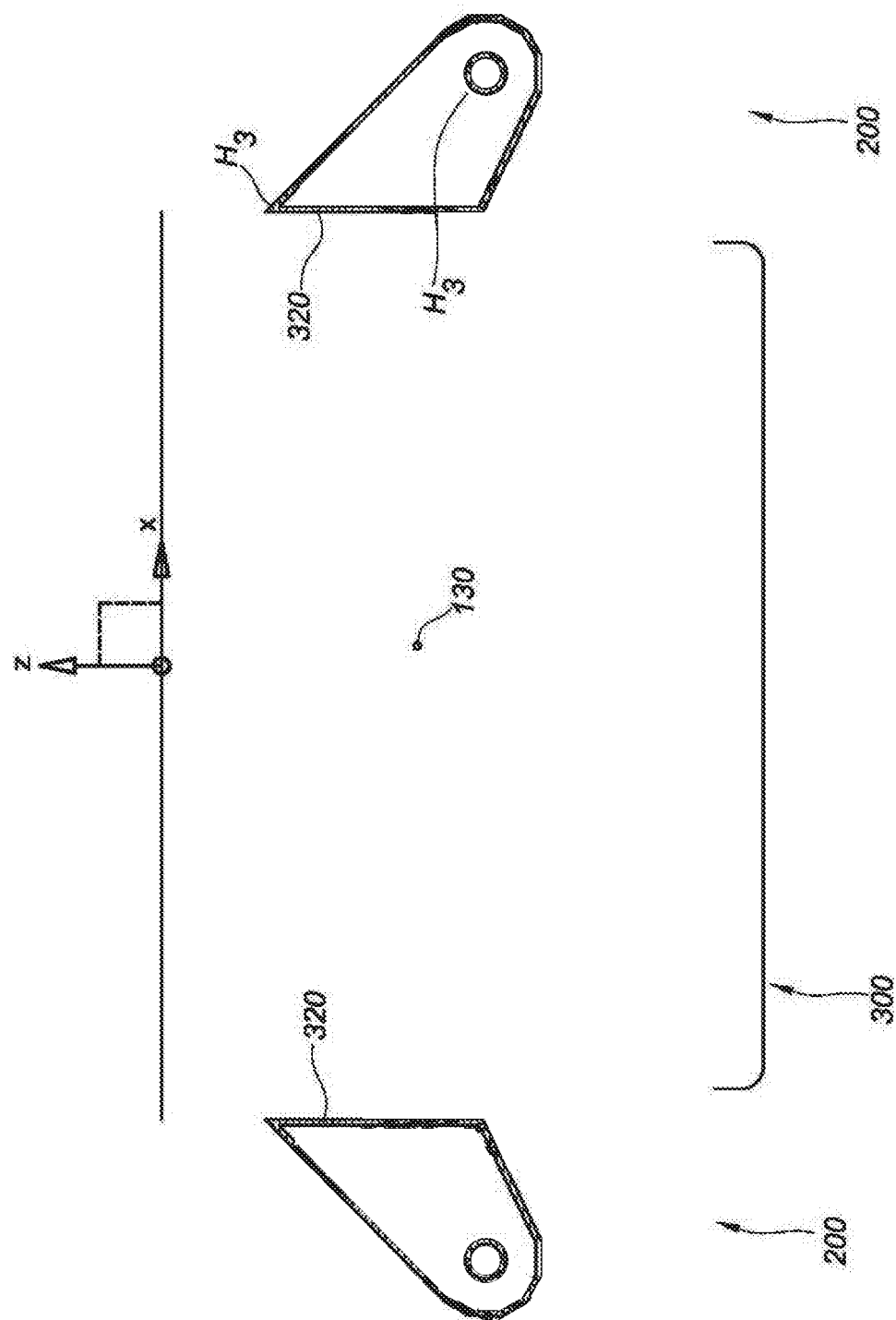
FIG. 7a(1)

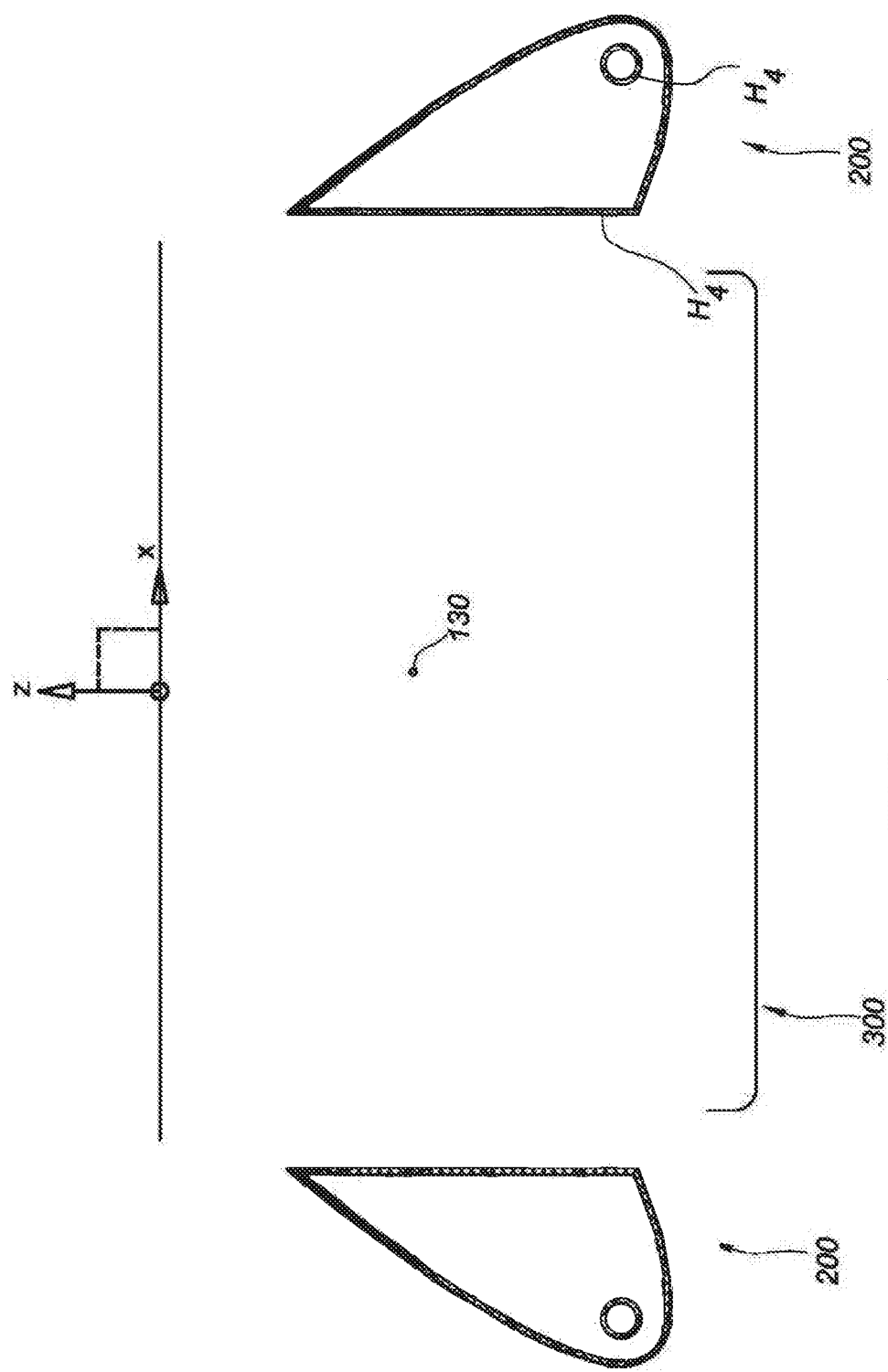
FIG. 7a(2)

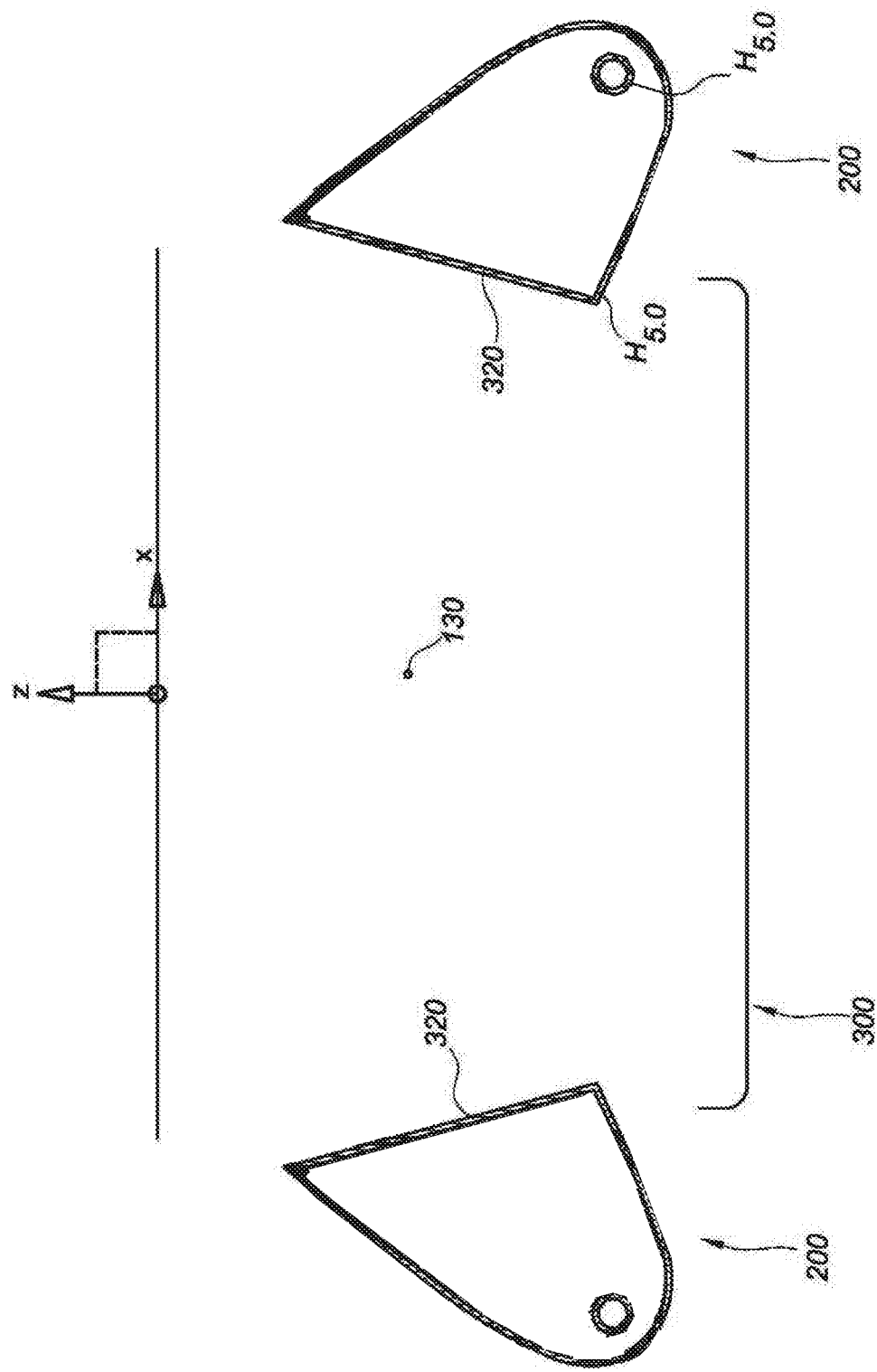
FIG. 7a(3)

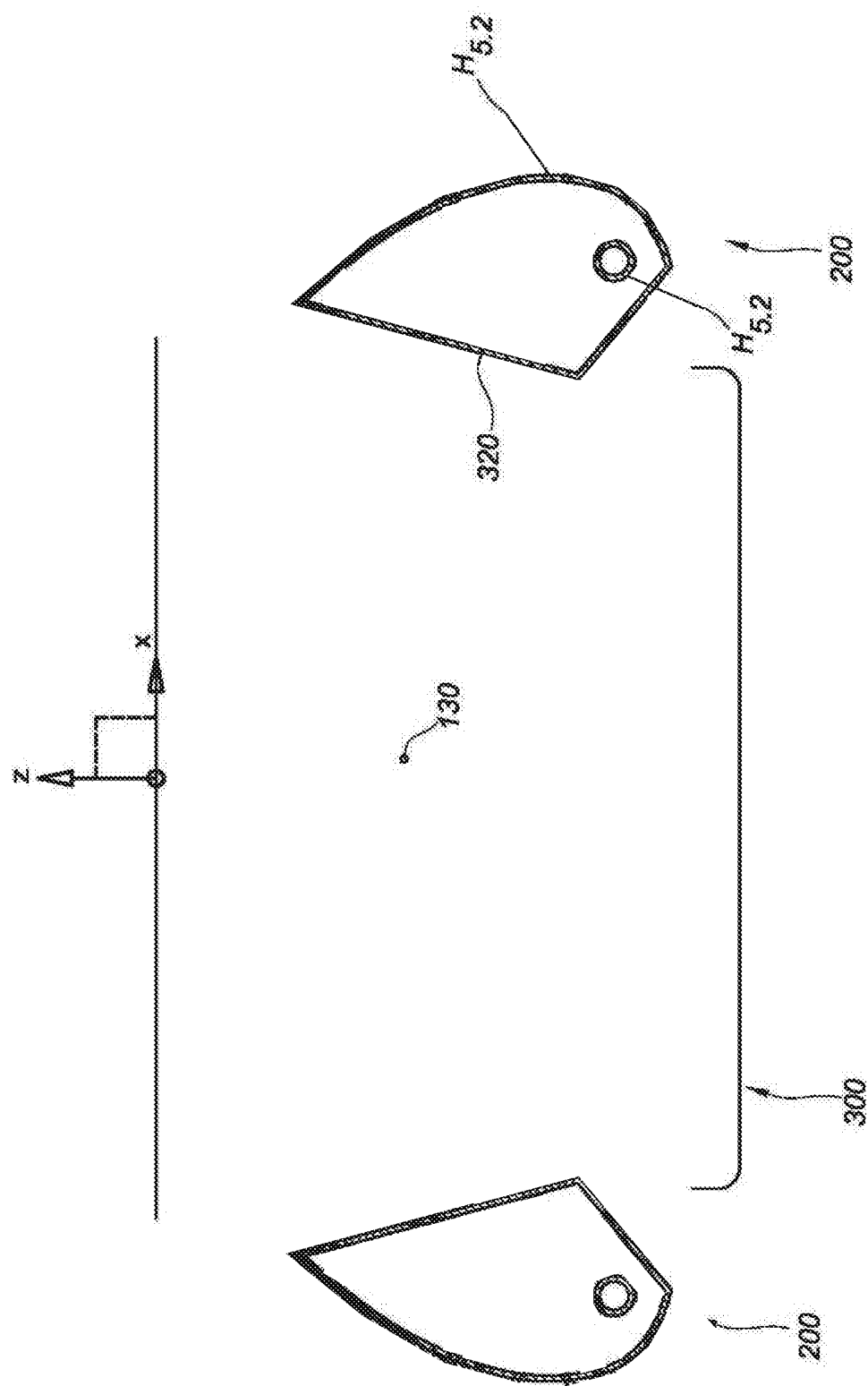

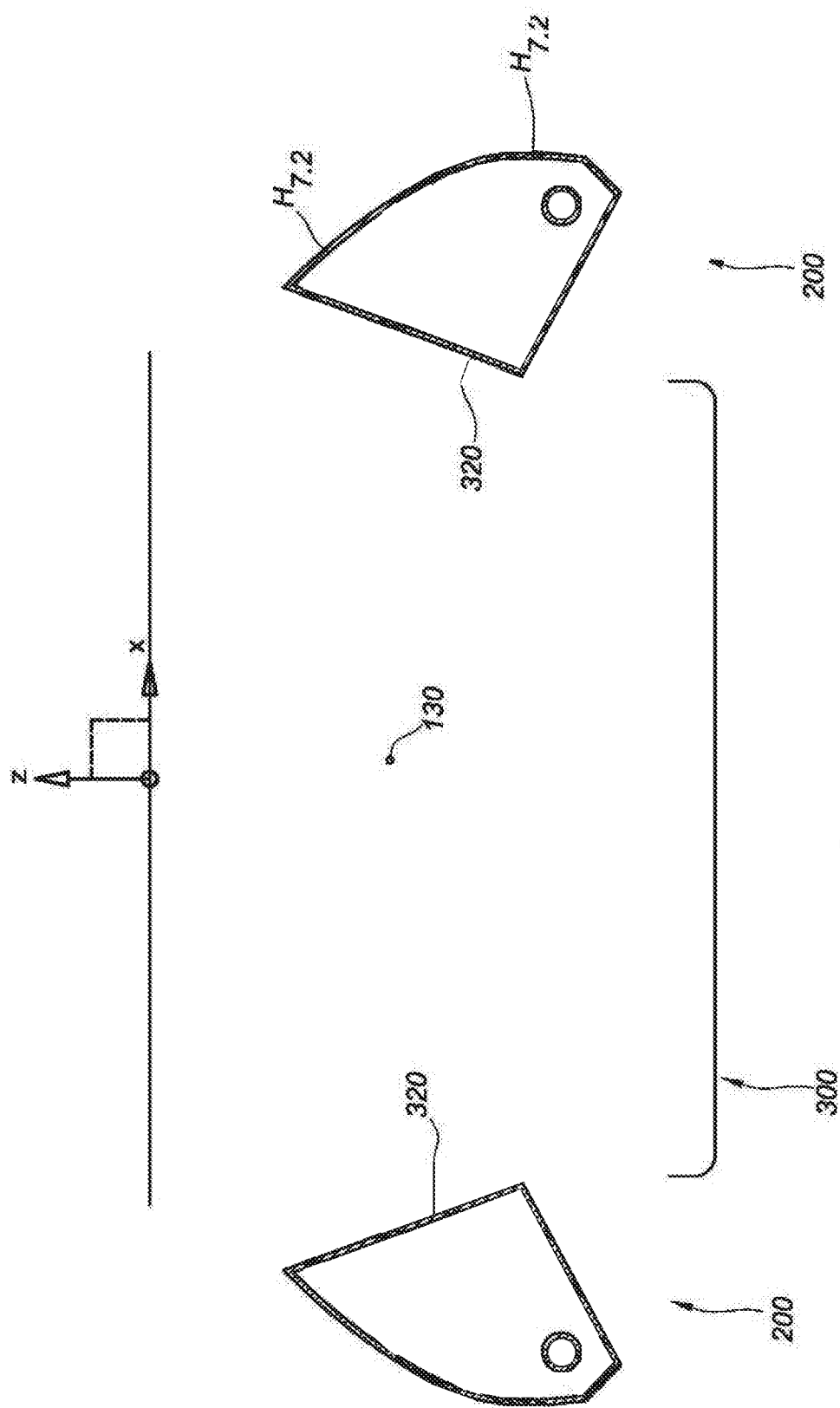
FIG. 7a(5)

RADIATION GRILL

CROSS-REFERENCE TO RELATED APPLICATION

The present application is a continuation of co-pending U.S. patent application Ser. No. 15/024,059, filed Mar. 23, 2016, which is the U.S. National Phase application under 35 U.S.C. § 371 of International Application No. PCT/EP2014/070302, filed on Sep. 24, 2014, which claims the benefit of International Application 13185733.6 filed on Sep. 24, 2013. These applications are hereby incorporated by reference herein.

FIELD OF THE INVENTION

The invention relates amongst others to a radiation grill and to a method for cooking a food product with such radiation grill.

BACKGROUND OF THE INVENTION

Electrical radiation grills are known in the art. EP1444939, for instance, describes a cooking apparatus capable of effectively utilizing thermal energy of a heating unit to heat food including a cabinet opened at a top surface thereof to provide an opening over which food to be cooked is laid. A grill unit is seated in the opening of the cabinet so as to support the food over the opening. A heating unit is provided in the cabinet so that a front surface thereof faces the grill unit to radiate thermal energy to the grill unit. A plurality of reflecting members are provided at predetermined positions around a rear surface of the heating unit and are installed to be spaced apart from each other by a predetermined gap to provide an air layer between the reflecting members. The construction of the cooking apparatus allows far infrared rays radiated from a rear surface of the heating unit to be reflected to a front of the heating unit, in addition to preventing heat from being transmitted from the heating unit to a rear portion of the heating unit due to an air layer provided between the reflecting members. According to EP1444939, most of the thermal energy generated from the heating unit may be used for cooking the food.

EP1444942 describes a cooking apparatus includes a body, a pair of heating units, a grill unit, a heat reflecting unit, and a cooling fan. The heating units are arranged between the grill unit and the heat reflecting unit. The heat reflecting unit includes inner and outer reflecting plates that are inclined at certain angles to reflect heat radiated from the heating units toward the grill unit. The cooling fan is positioned in an inner space of the heat reflecting unit. The heat reflecting unit has front, rear, and side plates, which are provided with a plurality of through holes, so that air passes through the inner space of the heat reflecting unit.

SUMMARY OF THE INVENTION

Disadvantages of prior art systems may include the fact that food products can easily burn. Further disadvantages may include inefficient use of electric energy. Prior art systems may also suffer from the problem that fat and oil drip in a drip tray, which may lead to dirty trays when the fat or oil turns into carbonized products. Systems that include drip trays with water may lead to difficult handling by the user. Prior art systems may also lead to undesired smoke creation, because of this carbonization of oil.

Hence, it is an aspect of the invention to provide an alternative radiation grill unit (herein also indicated as "grill" or "smokeless grill" or "apparatus"), which preferably further at least partly obviates one or more of above-described drawbacks.

The invention especially deals with radiation grills, which use infrared heaters in combination with reflectors to direct the heat to the food. The grill has a food support unit, such as a grill grid, which has the function to hold e.g. meat (or vegetables, fish, etc.) in or close to the area where the radiation is pointed at.

The present invention is especially directed to a radiation grill unit comprising (i) a food support unit, such as a grill grid (herein also indicated as "grid"), and (ii) a(n electrical) radiation unit, the radiation unit especially comprising a reflector hosting an (electrical) IR radiation heater, wherein the radiation unit is configured to provide IR radiation in a direction of the food support unit. Optionally, the radiation grill unit further comprises (iii) a radiation grill unit cavity configured to host a drip tray (herein also indicated as "tray").

In an embodiment, the food support unit comprises a grill grid with bars, the grill grid comprising a food support side and a radiation side. In yet another embodiment, the food support unit comprises one or more (elements) selected from the group (consisting) of a spit, a skewer, a clamp, and a hook. In this invention especially the grill grid will be described, because some surprisingly advantageous parameters are specially designed for this grill unit.

Hence, in a further embodiment, the food support unit may be integral part of the radiation grill unit, such as in the case of a spit. In yet another embodiment, the radiation grill unit is configured to support the food support unit, such as in the case of a grill grid. In an embodiment, wherein the food support unit is a unit that is not integrated with or temporarily part of the grill unit, the food support unit may be rotatable within the radiation grill unit, such as in case of a spit. In yet another embodiment, the food support unit is a unit that is not integrated with or temporarily part of the grill unit. Hence, in a further aspect, the invention also provides an arrangement of a radiation grill unit and a food support unit, as well as a method of cooking a food product with such arrangement.

Herein, the term "food product" may e.g. refer to (a piece of) meat, (a piece of) fish, (a piece of) fruit, (a piece of) vegetable etc. Further, the term "food product" may also relate to a plurality of food products.

A common practical problem when building radiation grills according to prior art concepts is that the reflector(s) can become very hot. Without any cooling, they may become 450° C. or even higher. At such temperatures, aluminum (which is an ideal reflector material since it has good reflective properties) may lose its strength. And even if strength (maintenance) was not a problem (e.g. by using a steel base material), such high temperatures may make it very difficult to comply with safety regulations that exist for domestic appliances, such as e.g. described in IEC-60335. Most of the prior art solutions do not seem to pay attention to this aspect.

Herein, a solution to cool the reflectors, especially with natural convection is proposed. The air flow may be guided in such a way that it is used to improve the functionality of the grill. Especially, a channel behind each reflector (unit) may be provided. With the free convection that originates from the hot, vertical surfaces in that area, an air flow may be created from below the reflectors, near the drip tray, to above the reflectors, near the food support unit, especially the grill grid. This has the advantage that the air is sucked in from a cool location (the surface on which the appliance is standing), cooling the drip tray along its path, and after exchanging heat with the reflectors, giving back part of this heat to the food in the form of hot air. As natural convection can be applied, this may add to user convenience, such as noise. It may also add to life time and ease of replacement of parts.

Especially assuming a reflector with a length of ~15-50 cm, such as 30-40 cm, it appears to be advantageous when the smallest distance between the reflectors and the housing is between 5 and 25 mm to allow for a stable, largely laminar flow. Furthermore, to substantially prevent that no obstructions exist for the airflow to move upwards, it is especially chosen that the cross section of the outlet opening may be substantially larger than the cross-sectional area of the inlet opening. This may promote a stable, laminar flow and a high air speed around the inlet opening, where most cooling is required. In this way, it is possible to achieve a heat-removing effect on the reflectors of at least 0.2 Watts per square cm of reflector surface (assuming a reflector temperature of 300° C.).

Hence, in an aspect, the invention provides a radiation grill unit comprising (i) a food support unit, and (ii) a radiation unit, especially comprising a reflector hosting an electrical IR radiation heater, wherein the radiation unit is configured to provide IR radiation in a direction of the food support unit, further comprising a radiation unit housing with a radiation unit housing cavity configured to host the radiation unit, wherein the radiation unit housing further comprises a convection channel configured to facilitate free convection of air along the radiation unit. The radiation unit housing may herein also be indicated as heat shield. Even more especially, the invention provides a radiation grill unit comprising (i) a grill grid with bars, the grill grid comprising a food support side and a radiation side, (ii) a radiation unit, especially comprising a reflector hosting an (electrical) IR radiation heater, wherein the radiation unit is configured to provide IR radiation in a direction of the radiation side of the grill grid, and (iii) a radiation grill unit cavity configured to host a drip tray, further comprising a radiation unit housing with a radiation unit housing cavity configured to host the radiation unit, wherein the radiation unit housing further comprises a convection channel configured to facilitate free convection of air along the radiation unit.

With such convection channel, a gas flow (air flow) may naturally be generated, i.e. natural convection. Hence, energy consuming, space consuming, and/or noisy fans or other devices like cooling means are not necessary.

Note that the radiation unit housing may in an embodiment be a separate housing within a larger housing, i.e. the radiation unit housing, or the grill unit housing itself may be the radiation unit housing. Especially, the radiation unit housing comprise a convection channel configured to facilitate free convection of air along the back side of the reflector (of the radiation unit).

In a further specific embodiment, the radiation unit housing comprises a radiation unit housing lower opening (herein also indicated as "lower opening") and a radiation unit housing upper opening (herein also indicated as "upper opening") defining a first end and a second end of the convection channel. The upper opening is closer to the food support unit, especially a grill grid, than the lower opening. Especially, the radiation unit housing upper opening may be configured to facilitate directing a flow of air escaping from the radiation unit housing upper opening in the direction of the radiation side of the food support unit, especially a grill grid. Hence, especially the radiation unit is arranged at a non-zero distance from the radiation unit housing (wherein such convection channel, with an inlet and an outlet, may be available). This convection channel may be an elongated channel, as the radiation unit may also be an elongated unit.

Especially, the radiation unit housing upper opening comprises a cross sectional upper opening area (A1) and the radiation unit housing lower opening comprises a cross sectional lower opening area (A2). In yet a further specific embodiment the convection channel has a ratio of the cross sectional upper opening area (A1) to the cross sectional lower opening area (A2) selected from the range of $0.8 \leq A1/A2 \leq 4$, even more especially $1 \leq A1/A2 \leq 2$. With dimension outside this range, flow may be less optimal. Hence, cooling may be worse and/or heating of the food product/food support unit may be worse.

In yet a further embodiment, the radiation unit has a radiation unit length (LR), wherein the radiation heater has a radiation heater length (LRH) and wherein the radiation unit housing cavity has a radiation unit housing length (LRUH), wherein $0.9 \leq LRH/LR < 1$, and wherein $0.9 \leq LR/LRUH \leq 1$. In other words, the (electrical) radiation heater length is nearly as long as its housing, the radiation unit; and, the length of the radiation unit is as long or nearly as long as its housing, the radiation unit housing.

Especially, the radiation grill unit may comprise a housing, wherein the housing comprises a housing opening for influx of air. In embodiments, the housing comprises a housing bottom and a housing edge, wherein one or more of the housing bottom and the housing edge comprise a housing opening for influx of air. Optionally, the grill unit, such as the housing, may further include a heat sink. Again, the term "heat sink" may also refer to a plurality of heat sinks.

Common (electrical) grills use a hot grid or hot plate to grill the food. The temperature of such grids or plates can easily reach temperatures in the range of 200-250° C. The disadvantage of this is that the food can easily burn, which is unhealthy, and that fat dripping from the food will burn and create smoke, which is undesired especially when grilling indoors.

With the radiation grill as suggested herein it is aimed to transfer energy from the heater to the meat or other type of food with the highest efficiency. Another goal is to prevent the drip tray gets hot via direct or indirect radiation heat. This is important to prevent smoke creation: fats and oils collected in the drip tray may not get too hot to prevent boiling and smoking. The present invention provides amongst others a grilling grid design that may prevent smoke creation, may create an optimal efficiency, and may make the grill easier to clean.

Herein, the term "grill grid", or "grilling grid" or "grid" especially refers to a 1D array of bars. Bars may also be indicated as "rods". These bars may especially be arranged parallel. The bars may essentially have a round or oval cross-section of a substantial part, such as at least 90%, of their length.

Some specific elements in this invention that can be used alone or can be combined to get the best effect may include (a) relative thin grid bars, relative large distances or areas in-between the grid bars, (b) an oil and fat guidance, and (c) an optimal grid bar direction. In embodiments of the present invention the grid is especially executed in a way that it reflects the radiation energy as little as possible and that it blocks the radiation energy as little as possible. It may also especially guide oil and fat drops to a location where it is easy to clean when dropping down.

Hence, in an aspect the invention provides a radiation grill unit comprising (i) a food support unit, and (ii) a radiation unit, especially comprising a reflector hosting an electrical IR radiation heater, wherein the radiation unit is configured to provide IR radiation in a direction of the food support unit, especially in the direction of a grill grid, wherein the food support unit comprises said grill grid with bars, wherein especially the bars have bar diameters (DB) and bar distances (PB), wherein the bar diameters (DB) are selected from the range of 1-4 mm, and wherein especially a ratio PB/DB between the bar distances (PB) and bar diameters (DB) is selected from the range of 2-10, such as 2-8. Herein, the "grid" especially refers to a 1D array of bars, and not to a 2D array of bars, with e.g. two sets of bars which are perpendicularly arranged to each other.

Especially, the invention provides a radiation grill unit comprising (i) a grill grid with bars (herein also indicated as "grid bars"), the grill grid comprising a food support side and a radiation side, (ii) a radiation unit, especially comprising a reflector hosting an (electrical) IR (infrared) radiation heater, wherein the radiation unit is configured to provide IR radiation in a direction of the radiation side of the grill grid, and (iii) a radiation grill unit cavity configured to host a drip tray, wherein especially the bars have bar diameters (DB) and bar distances (PB), wherein the bar diameters (DB) are selected from the range of 1-4 mm, and wherein especially a ratio PB/DB between the bar distances (PB) and bar diameters (DB) is selected from the range of 2-10, such as 2-8. The distances between the bars are herein distances between the centers of the bars. Hence the distance between the bars can also be indicated as pitch. Further, in general the pitch is uniform over the grill grid and also the bar diameter is uniform over the grill grid.

It appears that with such conditions, well cooked food products may be obtained in an efficient way, whereas with other conditions the efficiency and or the quality of the food product may be worse. Lower efficiencies increase the change on smoking and other undesired aspects. Such configuration, as especially indicated above, may allow a more efficient use of energy and may prevent unnecessary heating of the whole system. In a specific embodiment, the bar diameters (DB) are selected from the range of 2-3 mm, and the ratio (PB/DB) between the bar distances (PB) and bar diameters (DB) is selected from the range of 5-8, such as 5.5-7.5. This may even lead to better results.

The radiation side of the grill grid is the side of the grid directed to the radiation unit(s); the food support side is the opposite side of the grill grid; i.e. the part on which the food product(s) are arranged during use of the grill unit.

It further appears that to minimize the area that will not be reached by the infrared light because of the grid (shadow) the grid bars direction may especially chosen to be the same direction as the light (beams) and not perpendicular. Hence, in a further specific embodiment, the IR radiation heater is elongated (especially an elongated bar) with an axis of elongation, wherein the bars are configured in a plane parallel to the IR radiation heater and (wherein the bars are configured) perpendicular to the axis of elongation. In this way, a substantial part of the IR radiation may be parallel to the bars.

Hence, the IR radiation heater is especially elongated, such as having a length of at least 8 cm, such as at least 20 cm, like a length selected from the range of 8-150 cm, like 15-80 cm, such as especially ~15-50 cm, such as 15-45 cm, such as 30-40 cm. Elongated IR radiation heaters are herein also indicated as linear heaters. Optionally, a radiation unit may comprise a plurality of IR radiation heaters, which may be arranged in an embodiment parallel, and which may in another embodiment be arranged in series.

The IR radiation heater is herein especially an electrical radiation heater. For instance, this may be electrically conductive bar, or a (electrically non-conductive) bar with an electrically conductive wire wound around the bar. The IR radiation heater may thus especially have a diameter, which may be in the range of e.g. 2-30 mm, such as 3-20 mm (including optional wiring). By applying a current through the electrically conductive bar or electrically conductive wire, the electrically conductive part is heated and generates IR radiation (and optionally (some) visible radiation).

In a specific embodiment, especially a design for the (electrical) (IR) radiation heater comprises a heater wire wrapped around an electrical insulated coil. An embodiment is amongst others described in EP application number 13162278.9, filed 4 Apr. 2013, which is incorporated herein by reference. Hence, in a further aspect the radiation heater comprises a heating tube, comprising a tube, a first resistance wire associated with the tube, and a second resistance wire associated with the tube, wherein both the first resistance wire and the second resistance wire have electrical connections arranged at their ends, for electrically connecting the resistance wire in an electrical circuit, and wherein at least one of the electrical connections of the first resistance wire and at least one of the electrical connections of the second resistance wire, respectively, are separate from each other. In an embodiment, at least one of the first resistance wire and the second resistance wire is arranged inside the tube. In yet a further embodiment, the first resistance wire is an outer resistance wire arranged at an outer surface of the tube, and wherein the second resistance wire is an inner resistance wire arranged inside the tube. Especially, the first resistance wire and the second resistance wire have different electrical resistance. In an embodiment, the first resistance wire and the second resistance wire are arranged in series. Optionally, a power connection means may be applied, which power connection means may be adapted to be connected to an electrical power source, and a switching means arranged between the power connection means and the heating tube, wherein the switching means is adapted to assume one of a position for disconnecting the heating tube from the power connection means, a position for connecting both resistance wires of the heating tube to the power connection means, and a position for connecting only one of the resistance wires of the heating tube to the power connection means.

Hence, the radiation unit may further include an infrastructure for providing a current to such electrically conductive part of the radiation unit, like electrically conductive wires and a plug. The power supplied to the IR radiation heater may especially be in the range of 500-3000 Watt, such as at least 1000 Watt and/or at maximum 2500 Watt. The power per area supplied to the radiation side of the grill grid (radiation side) may be in the range of 1-2.5 W/cm$^2$, especially in the range of 1.5-2.2 W/cm$^2$. Below these values, the grilling performance may become unacceptable (low), whereas above these values too much smoke production may be experienced, and the food may thus burn more easily.

When e.g. meat is grilled, fat and oils will drain out of the meat and drop down in the direction of the drip tray. For cleanability and smoke prevention it is not preferred that oil drops down on e.g. the radiation unit, such as on a protective window in front of the radiation unit, like glass (see also below). This can be achieved by executing the grilling grid in a way that at least a part of the (total number of) oil droplets are guided via a sloped under-side of the grid (and via gravity), such as for instance away from the glass area (of a protective window, see below). Oil will drop directly in the drip tray and not on the glass. Herein, oil and fat is also indicated as lipid. Further, the term "lipid droplet" is used. This term refers to any droplet that may drip from the food product or grid during use of the radiation grill unit and which contains fat and/or oil. Further substances, like other food components, or like carbon, may also be contained in such lipid droplet. This principle may also apply when cooking fruit and/or vegetables etc. with the (present) radiation grill. Especially then, droplets of water and other material may be formed, such as sugar, carbohydrates, etc. etc. It is also less desired that such droplets lead to undesired sedimentation of (waste) material and (thus) potential smoke formation and consequences like cleaning difficulties. Herein, the invention is especially further described with respect to lipid droplets by way of example only. However, this term "lipid droplets" and the term "lipid waste" (see below) may be replaced by droplet with food material or droplet with (food) waste material, respectively.

Hence, in yet a further embodiment, the bars have bar lengths (LB), wherein the bars comprise sloping parts configured to facilitate dripping of a lipid droplet (7), especially into the drip tray, wherein the sloping parts are especially configured at one or more of a position within 0-10% (of the bar length (LB)) and a position within 90-100% of the bar length (LB). The bars have bar ends, and close to those bar ends such sloping parts may be available, such as for instance within 5 cm, especially within 2 cm of the bar ends. The sloping parts may include features that facilitate dripping of a lipid droplet. When choosing the proper dimensions of the drip tray, the bars and the sloping parts, droplet escaping from the bars may escape above the drip tray. Hence, the sloping parts may especially be configured to facilitate droplet collection in the drip tray (and not next to the tray, such as on the reflector(s)). Hence, in a specific embodiment, the sloping part(s) may be configured to facilitate transport of liquid in a direction of the middle of the bar (i.e. about to a place at the bar at about half of the length of the bar). Or, in other words, the sloping part(s) may be configured to facilitate transport of liquid in a direction away from an end (to which the liquid is closest). Especially, the sloping part(s) may be configured to facilitate transport of liquid in a direction of 0.5 LB (i.e. the middle of the bar), wherein LB is the length of the bar(s).

In general, the bars will have a part that can be used to arrange the food product on. This may include the entire length of the bar, or a substantial part thereof. This part is herein also indicated as bar support part, as it can be used as support for the food product, or intermediate part (see below). Especially, the bars may comprise bar end parts and bar support parts, the bar support part having a length of at least 80%, especially at least 90%, of the bar length (LB), with the sloping parts between the bar end parts and the bar support part. The sloping parts will in general be at the radiation side of the grill grid. Embodiments of the sloping parts may be chosen that have also a geometrical effect on the food support side of the grill grid. For instance, the sloping parts may include a curvature in the bars. Hence, for instance a grid may be provided wherein the bars comprise intermediate parts which are arranged lower relative to the bar end parts. Between the bar end parts and the intermediate bar of a bar, a curved bar part may be available. Such curvature in the bar may also be advantageous to guide the food product to the (desired) (food support side of the) intermediate part. Here, the curvature especially relates to a curvature relative to a length axis of the bar(s).

As indicated above, the dimensions and geometry (of the grill bars) may be chosen to facilitate dripping of lipid droplets in a tray arranged below the grill grid (during use). It may especially be helpful when the sloping parts facilitate the lipid droplets falling in the drip tray due to gravity. Hence, in yet a further embodiment, the bars comprise intermediate parts between the sloping parts, wherein the intermediate parts have lengths (SPL) in the range of 70-98% of the bar length (LB), wherein the radiation grill unit hosts said drip tray, wherein said drip tray has a drip tray width (WT), and wherein the drip tray width (WT) is equal to or larger than the length (SPL) of the intermediate parts. The food product may be arranged on the intermediate part (at the food support side (thereof)). In other words, the drip tray width is chosen such that the drip tray can be arranged under grill grid with the sloping parts over the drip tray. As indicated above, the intermediate parts may be arranged lower relative to the bar end parts (i.e. when the grill grid is arranged in the grill unit).

The term "radiation unit" may also refer to a plurality of radiation units. Hence, the grill unit may comprise a plurality of radiation units. In general, the grill unit comprises two radiation units, or a plurality of sets of two radiation units, which sets of radiation units opposite of each other, with the cavity (optionally including the drip tray), or (at least) a substantial part thereof, in between. Hence, the invention further provides an embodiment wherein the radiation grill unit comprises (at least) two radiation units opposite of each other and (configured at both grill edges and) both configured to provide IR radiation in a direction of the radiation side of the food support unit, especially a grill grid, wherein the (at least) two radiation units are configured at a smallest radiation unit distance (WRU) from each other, wherein especially the smallest radiation unit distance (WRU) is equal to or larger than the length (SPL) of the intermediate parts. This may substantially reduce dripping of lipid droplets (from the food product and/or grill grid) on the radiation unit. However, especially when a protective window is applied (see below), optionally the smallest radiation distance may be smaller than the length (SPL) of the intermediate parts, as droplets reaching the protective window may further migrate downwards and fall in the drip tray (when the width of the drip tray is especially larger than the smallest radiation unit distance; see also below (when e.g. a protective window lower edge is configured above the drip tray face)). In specific embodiments, WT>WRU>SPL. As indicated above, the radiation unit especially comprises an electrical radiation unit.

In most of the prior art documents the shape of the reflector is not described at all, or at least not in detail. In some prior art systems the shape is clearly shown as parabolic. However, a certain portion of the energy in such systems appear not (directly) to go to the food product. Some radiation in prior art systems typically also goes to the drip tray, located at the bottom, heating up the drip tray which appears to enhance the generation of smoke (during use of the grill).

However, herein a reflector shape is described which maximizes the amount of radiation reaching the food and minimizes the amount of heat going to the opposite reflectors, glass shields, housing, drip tray, etc.

Especially, the new reflector shape has been constructed such that one or more may apply (a) the energy may equally be distributed over the grilling surface (please note (in this embodiment and other embodiments) that the grill may especially use two reflectors (i.e. especially radiation units), so the radiation at a certain point at the food support unit, especially on the grill grid, is the sum of the radiation from both sides), and (b) no radiation may reach the opposite reflector and/or glass shield (i.e. the opposite radiation unit and its optional protective window, see also below), nor the drip tray. Hence, in order to achieve this, the reflector may especially have two main surfaces: (i) a substantially parabolic-shaped surface behind the heater, to achieve a homogenous distribution and (ii) a substantially straight surface, positioned under an angle, to block the rays that would otherwise be directed towards (the drip tray and/or) the opposite reflector, and/or at the same time to improve the homogeneity at the grid near the edges.

Hence, in an aspect, the invention provides a radiation grill unit comprising (i) a food support unit, and (ii) a radiation unit, especially comprising a reflector hosting an (electrical) IR radiation heater, wherein the radiation unit is configured to provide IR radiation in a direction of the food support unit, especially comprising (at least) two radiation units opposite of each other and (especially configured at both grill edges and) both configured to provide IR radiation in a direction of the food support unit, especially in the direction of the radiation side of the grill grid, and wherein the (at least) two radiation units are configured to direct substantially all IR radiation that leaves the respective radiation units to the food support unit. Even more especially, the invention provides a radiation grill unit comprising (i) a food support unit, especially a grill grid with bars, the grill grid comprising a food support side and a radiation side, (ii) a radiation unit, especially comprising a reflector hosting an (electrical) IR radiation heater, wherein the radiation unit is configured to provide IR radiation in a direction of the food support unit, especially in the direction of the radiation side of the grill grid, and (iii) a radiation grill unit cavity configured to host a drip tray, especially comprising (at least) two radiation units opposite of each other and (especially configured at both grill edges and) both configured to provide IR radiation in a direction of the food support unit, especially in the direction of the radiation side of the grill grid, and wherein the (at least) two radiation units are configured to direct substantially all IR radiation that leaves the respective radiation units to the food support unit. With such configuration, substantially all IR radiation may be directed to the food support unit and substantially no IR radiation, or at least substantially no direct IR radiation may impinge on other parts of the grill unit, such as an opposite radiation unit. Further, such configuration may add to an even distribution of the IR radiation over the radiation side of the food support unit. This may improve efficiency of the grill unit, even though prior art seems to teach other configurations, such as projection of a substantial part of the IR radiation on a wedge shaped drip tray. Such wedge-shaped drip tray is intended to reflect the heat, and is thereby part of the total reflector system. A disadvantage of such solution may be that this may cause a very hot drip tray, and thus smoke generation. Further, efficiency of the radiation units may be improved and life time of the grill unit may also be improved. Herein, the phrase "opposite of each other" may especially indicate that the (at least) two radiation units are each arranged at an end of the grill unit cavity, especially with a substantial part of the (remaining) grill unit cavity in between. When the drip tray is arranged in the grill unit cavity, the phrase "opposite of each other" may especially indicate that the two radiation units are arranged each at a side of the drip tray, with the drip tray in between. Assuming the presence of a grill grid having a width WG, the shortest distance between the two oppositely arranged radiation units may e.g. be in the range of 0.6-1.4 WG, especially 0.8-1.2 WG. For instance, the (at least) two radiation units may be configured at both grill edges.

In a specific embodiment the (at least) two radiation units are configured to direct at least 50%, especially at least 70%, such as even more especially at least 75% of the total power (W) of the IR radiation that leaves the respective radiation units to the food support unit, especially the grill grid. The IR radiation that is able to escape from the reflector, which may include direct and indirect radiation, may be measured with an IR detector, such as a (heat) flux IR radio meter, which are known in the art. By evaluating the signal of the IR detector at different position, one may evaluate what part of the power reaches the food support unit, especially the grill grid, and what part of the power is received by other parts of the grill unit. Note that phrases like "directing to the grill grid" or "reaching the grill grid" and similar phrases may in fact refer to the total cross-sectional area (of a plane through) the grill grid or the total cross-sectional area of the radiation side of the grill grid.

In yet a further embodiment, the radiation units comprise a lower reflector part with a lower reflector part edge and an upper reflector part with an upper reflector part edge, wherein the (at least) two IR radiation heaters are configured at a first depth (b) below the lower reflector part edges and at a second depth (d) below the an upper reflector part edges, wherein the radiation heaters are further configured at a first horizontal distance (a) from the lower reflector part edge and at a second horizontal distance (e) from the upper reflector part, wherein the (at least) two radiation heaters are configured at a mutual distance (c) from each other, wherein $0.6 \leq a*d/(b*(c-e)) \leq 1.4$. Especially, $0.8 \leq a*d/(b*(c-e)) \leq 1.2$. It appears that with especially these dimensions very efficient the food product may be irradiation whereas dimensions outside these ranges may be less efficient. As indicated above, sets of two (oppositely arranged) radiation units may be applied.

In yet a further embodiment, the radiation heater of a first radiation unit is configured below a line through the upper reflector part edge of the radiation heater of a second radiation unit and the lower reflector part edge of the first radiation unit. Especially, a central axis or axis of elongation of the radiation heater of a first radiation unit is configured below a line through the upper reflector part edge of the radiation heater of a second radiation unit and the lower reflector part edge of the first radiation unit. Hence, with such dimensions, direct IR radiation of the opposite radiation unit may substantially be prevented.

As indicated above, especially the radiation unit(s) comprise a lower reflector part comprising faces with mutual angles ($\alpha$), and an upper reflector part having a parabolic-like shape. Especially, this lower reflector part may comprise two faces, having a mutual angle ($\alpha$) (see FIG. 3b) in the range of 45-135°, especially 75-105°. Hence, the reflector(s) may essentially comprise of three faces, a curved face have a substantially parabolic shape (as upper part), and a lower part that comprises two faces, which partially mimics a parabolic shape, but which allows the lower reflector part to be relative shorter than when a pure parabolic lower part would be chosen. However, in other embodiments especially the radiation unit(s) comprise a lower (substantially flat) reflector part comprising a single face, and an upper reflector part having a parabolic-like shape. Hence, in some embodiments the radiation unit(s) comprise a lower reflector part with a face having a non-parabolic shape, such as a flat shape, and an upper reflector part having a parabolic-like shape. In a specific embodiment, the heating element may be configured on the centerline of the parabolic-like shape and as close as possible to the focus of that parabolic-like shape; with especially taking into account a minimal distance between the reflector and the heating element.

It may not be optimal, and, depending on the design of the apparatus, it may sometimes even not be possible, to solve the problem of splattering fat and/or oil on the reflectors. Further, it appears to be difficult to make the reflectors easily cleanable. First of all, the reflectors may typically become so hot (easily 200-360° C.) that the fat will already burn in before the user gets the chance to clean the reflectors. Secondly, the best reflectors are made from very reflective material, usually aluminum, and regularly cleaning these surfaces with brushes, sponges or other (abrasive) material will have a negative impact on the reflection coefficient.

It appears that using a (glass) shield is a better way to protect the reflectors, since the glass plates are easier to reach, and glass is also better resistant against aggressive cleaning methods. Further, it may protect a user from touching the radiation heater. One of the problems to deal with when using glass shields is that most types of glass block a significant part of the light spectrum, especially the infrared part (above 3 micrometers) which is the most relevant for grilling. A solution for this would be to use quartz glass (fused silica) which is significantly more translucent than regular glass in the range of 3-4.5 micrometers. Surprisingly, it appears that the difference in grilling result/time between quartz and regular glass is not very large. Analyses showed that this is due to the fact that the glass heats up (due to the energy it receives from the blocked light), and can easily reach temperatures of 300-450° C. At this temperature, it starts to radiate towards the food again, effectively reducing the real energy losses. Hence, an aspect of the present invention is that when a protective window is applied, this is especially not configured "substantially vertical". Such orientation, the re-radiated heat does not reach the food in an optimal way. This results in reduced energy efficiency of the grill. The protective window is transmissive for IR radiation, i.e. it allows transmission of at least part of the IR radiation generated by the IR radiation heater. The phrase "transmission of at least part of the IR radiation" may also refer to embodiments wherein some part of the IR wavelength range may be transmitted better by the protective window than other parts of the protective window.

Hence, it is further suggested to arrange a protective window, such as the glass, at an angle from the "substantially vertical orientation". By putting the glass shields (or other protective window) at an angle, it is possible to increase the amount of re-radiated energy from the glass that reaches the food. This is because, at an angle, the so-called view factor increases. The larger the angle, the better the view factor (see also below), and the more radiation will go through the protective window (such as a glass shield) instead of being reflected on the surface of the protective window (such as the glass surface) into the reflector again, but using large angles may also have a disadvantage as oil and/or fat from the food may drip more easily on the glass. It appears that using the Hottel Crossed String Method for View Factor, the ideal range for the angle will be between 0-60° (but at least larger than 0° (i.e. not vertical), especially 10-45°, like 15-20°. For instance, already at a relatively small angle of 15°, the efficiency gain of the re-radiated energy is approximately 35%, resulting in a total efficiency improvement of approximately 17.5% (assuming the re-radiated energy is around 50% of the total energy reaching the food support unit, which is a realistic assumption). At 45°, the gain is even ~50%. At higher angles the efficiency still gradually increases further, but the disadvantages (the glass becoming dirty more easily, and the associated smoking) also become much more prominent. Especially, a lower part of the reflector, especially at the lower part edge, a tangent may have an angle γ (see FIG. 3b) with a horizontal in the range of 10-45°, especially 10-40°, such as 15-35°.

Hence, in an aspect, the invention provides a radiation grill unit comprising (i) a food support unit, and (ii) a radiation unit, especially comprising a reflector hosting an electrical IR radiation heater, wherein the radiation unit is configured to provide IR radiation in a direction of the food support unit, wherein the radiation unit further comprises a protective window which is transmissive for the IR radiation, wherein the protective window is arranged under an window angle (β) selected from the range of 0<β≤60° relative to a normal to earth's surface. The phrase "relative to a normal to earth's surface" especially indicates a configuration during normal use of the radiation grill unit.

Even more especially, the invention provides a radiation grill unit comprising (i) a grill grid with bars, the grill grid comprising a food support side and a radiation side, (ii) a radiation unit, especially comprising a reflector hosting an (electrical) IR radiation heater, wherein the radiation unit is configured to provide IR radiation in a direction of the radiation side of the grill grid, and (iii) a radiation grill unit cavity configured to host a drip tray, wherein the radiation unit further comprises a protective window which is transmissive for the IR radiation, wherein the protective window is arranged under an window angle (β) selected from the range of 0<β≤60° relative to a normal to the grill grid.

Especially, the protective window (essentially) closes of the reflector opening.

As a (substantial) vertical orientation of the protective window may be less desired, here the angle of >0° relative to a normal to earths face, or in specific embodiments relative to a normal to the grill grid, is defined. Again, this may especially apply to conditions during use of the radiation grill unit.

Especially, the window angle (β) selected from the range of 10≤β≤45°, even more especially the window angle (β) selected from the range of 15≤β≤45°. As indicated above, these angles may provide an optimum with respect to protection of the radiation heater and/or reflector and with respect to efficiency of cooking (especially thus grilling) the food.

As indicated above, in an embodiment the protective window comprises glass, especially the protective window comprises glass ceramic. In yet another embodiment, the protective window comprises quartz.

In yet a further specific embodiment, the protective window comprises a protective window lower edge, wherein the radiation grill unit (is configured to) comprise(s) said drip tray, said drip tray comprising a drip tray face, and wherein the protective window lower edge is configured above the drip tray face (when the drip tray is configured in the radiation grill unit cavity). Hence, any lipid droplet that may fall down at the protective window may, dependent upon the conditions, further travel under influence of gravity down to said protective window lower edge and then fall down in the drip tray (if not vaporized or burned). Herein, the phrase "droplet falling down" may optionally also refer to a droplet splashing or spattering away.

Note that a lower part edge of the reflector may penetrate (or extend into) the grill cavity more than the upper part edge of the reflector. Assuming two oppositely arranged radiation units, the shortest distance between the lower part edges of the two opposite radiation units will in general be shorter than the shortest distance between the upper part edges of the same two opposite radiation units. Especially, the lower part edge of the reflector may have a shortest (horizontal) distance to a central point in the grill cavity that is shorter than a shortest (horizontal) distance from the upper part edge of the reflector to the central point in the grill cavity.

The same may apply when a protective window is applied. A lower edge of the protective window may penetrate the grill cavity more than the upper edge of the protective window. Assuming two oppositely arranged radiation units, the shortest distance between the lower edges of the two protective windows of the two opposite radiation units will in general be shorter than the shortest distance between the upper edges of the same two protective windows (of these opposite radiation units). Especially, the lower edge of the protective window may have a shortest (horizontal) distance to a grill unit central point or grill unit body axis in the grill cavity that is shorter than a shortest (horizontal) distance from the upper edge of the protective window to the grill unit central point or grill unit body axis in the grill cavity.

The angle may thus especially be chosen such that an inclined protective window is obtained, which, when seen from a lower part (lower edge) of the protective window, inclines away from (a grill unit central point or grill unit body axis of the) the grill cavity.

Since burning fat (or other food waste material) creates smoke, it is desired to prevent that the drip tray, which collects the fat that drips from the food, gets hot via direct or indirect radiation. The reflector can be constructed in such a way that it minimizes the amount of direct radiation from the heater that reaches the drip tray (see elsewhere). However, there is also indirect radiation from parts in the system that heat up (e.g. the glass plates; see elsewhere). For this reason, the drip tray may still gradually heat up, no matter how well the reflector is designed. The drip tray can be made from a highly reflective material, to minimize the amount of radiation that gets transformed into heat, but handling and cleaning the drip tray will cause this reflectivity to reduce over time. Moreover, the fat itself, which forms a layer on the bottom of the drip tray, absorbs radiant energy, causing it to heat up as well.

Herein, the invention provides a specially designed drip tray that may be configured to drain away the fat to minimize the risk that the fat in the drip tray overheats and causes smoke.

Especially, the surface on which the fat falls (drip tray face) may have a sloped surface, so that the fat starts to flow to the edge where the surface is at its lowest points. Good results seem to be obtained when a reservoir for collecting said fat and/or oil is positioned on the sides of the grill, particularly on the two short sides, which can be protected from radiation.

After prolonged grilling of fat-rich food, such as hamburgers, a lot of fat can collect on these edges, so that the fat level will rise and spread over the whole surface again.

Hence, in an aspect, the invention provides a radiation grill unit comprising (i) a food support unit, and (ii) a radiation unit, especially comprising a reflector hosting an electrical IR radiation heater, wherein the radiation unit is configured to provide IR radiation in a direction of the food support unit, wherein the radiation grill unit comprises said drip tray, wherein the drip tray is especially configured in the radiation grill unit cavity out of the line of sight of direct IR radiation from the radiation heater, wherein the drip tray comprises a drip tray face and a drip tray reservoir (herein also indicated as "reservoir") configured at an edge of the drip tray and configured to (temporarily) store a lipid comprising liquid, and wherein the drip tray face comprises collection means configured to guide the lipid comprising fluid from the drip tray face to the drip tray reservoir. Even more especially, the invention provides a radiation grill unit comprising (i) a grill grid with bars, the grill grid comprising a food support side and a radiation side, (ii) a radiation unit, especially comprising a reflector hosting an (electrical) IR radiation heater, wherein the radiation unit is configured to provide IR radiation in a direction of the radiation side of the grill grid, and (iii) a radiation grill unit cavity configured to host a drip tray, wherein the radiation grill unit comprises said drip tray, wherein the drip tray is especially configured in the radiation grill unit cavity out of the line of sight of direct IR radiation from the radiation heater, wherein the drip tray comprises a drip tray face and a drip tray reservoir configured at an edge of the drip tray and configured to (temporarily) store a lipid comprising liquid, and wherein the drip tray face comprises collection means configured to guide the lipid comprising fluid from the drip tray face to the drip tray reservoir.

With such drip tray, lipid droplets are collected at the drip tray face, with migrate then to the drip tray reservoir. This migration or drainage is especially facilitated by the collection means. For instance, the drip tray face may have a V-shape or a A-shape, especially a V-shape. Further, the drip tray face may include a curvature, to facilitate migration of liquid lipid (and other material) to the reservoir. There are a number of reasons to choose a configuration that facilitates drainage of the fat and other liquids to the middle (and to the reservoir(s) of the drip tray, especially at the edge(s) of the drip tray). Amongst others, the hottest spots in the drip tray may be the areas near to the radiation unit (especially due to the indirect radiation). In the drip tray these spots are the highest to let the fat/liquid flow away from that area to a location that does not even have indirect radiation as the reservoirs may be behind and/or below cavity edges of the device. Further, tests have shown that a layer of oil/fat may absorb much more radiation and turning it into heat energy. If the fat flows away after falling in the drip tray the layer will not stay there or otherwise be very thin. Less radiation will be transferred into heat energy. Further, when droplets fall into a level of liquid there is a chance of splashing to the very hot reflector (glass) and that creates immediately smoke and noise. The drip tray may be the most shallow near to the hot reflector (glass).

Note that especially herein the drip tray does not receive direct IR radiation from the radiation unit(s). It appeared that this should be prevented in view of efficiency, smoke production, and in view of cleaning aspects. For users the effects are also beneficial, as cleaning may take less time and life time of the grill unit may be increased. As the drip tray may stay relatively cool, there may be substantially no smoke production.

In a specific embodiment, the drip tray face may comprise a central collection channel in fluid connection with the drip tray reservoir. As indicated above, especially the drip tray reservoir has a storage volume for the lipid comprising liquid (or any other liquid) in the range of about 50-350 ml, such as 100-250 ml, like at least 150 ml. As indicated above, the term "drip tray reservoir" may refer to a plurality of reservoirs (having in total such storage volume). In yet a further embodiment, see also above, the drip tray face comprises a curvature configured to guide the lipid comprising fluid from the drip tray face to the drip tray reservoir. In a further specific embodiment, the drip tray face has a saddle-like shape, and wherein the drip tray comprises two or more drip tray reservoirs at the edges of the drip tray.

The drip tray may for instance be made via a process such as injection molding (of e.g. heat resistant plastic) or deep drawing of metal (stainless) steel or aluminum, with possibly a dish washer resistant and easy to clean surface like a chromized (provided with a chromium layer) or enameled surface. Further, the drip tray may (thus) essentially consist of a material like steel, aluminum, or optionally heat resistant plastic, especially stainless steel or aluminum.

As indicated above, the drip tray may be configured to store a lipid comprising liquid. As will be clear to a person skilled in the art, this may be a temporary storage, as e.g. after use the drip tray may be cleaned. Further, the phrase "configured to store a lipid comprising liquid" may especially indicate that the drip tray is able to hold or store a liquid (and/or solid or solidified) material. This should not necessarily (only) include a lipid comprising liquid.

Especially, a radiation grill unit as defined herein is provided, wherein all direct IR radiation that escapes from the radiation unit is received by the radiation side of food support unit, especially the grill grid.

In yet a further aspect, the invention also provides a method for cooking a food product, the method comprising arranging the food product to the food support unit, especially a grill grid, of the (electrical) radiation grill unit and providing IR radiation to the food product. In yet another aspect, the invention also provides a cooked food product, especially a grilled food product, obtainable with the method as described herein and/or obtainable by grilling the food product with the radiation grill unit as described herein. Hence, one may for instance arrange the food product on a grill grid or attach to a hook or spit, etc.

In yet a further aspect, the invention also provides a food support unit per se, especially a grill grid with bars, wherein the bars have bar diameters (DB) and bar distances (PB), wherein the bar diameters (DB) are selected from the range of 1-4 mm, and wherein a ratio PB/DB between the bar distances (PB) and bar diameters (DB) is selected from the range of 2-10.

In yet a further aspect, the invention also provides a drip tray per se, especially a drip tray comprising a drip tray face and a drip tray reservoir configured at an edge of the drip tray and configured to (temporarily) store a lipid comprising liquid, and wherein the drip tray face comprises collection means configured to guide the lipid comprising fluid from the drip tray face to the drip tray reservoir.

Note that in general the drip tray and/or the food support unit, especially a grill grid, are removable items, which may be removed without the necessity of e.g. unscrewing (from the radiation grill unit).

As indicated above, the radiation grill unit is especially an electrical radiation grill unit with electrical (radiation) heaters. The radiation grill unit may include a power regulation. Further, the radiation grill may in embodiments not include a temperature regulation. Prior art systems may include an energy storage (in the grill surface). If the temperature of this storage is too high or too low, the thermostat will switch the heating element on and off. In this invention, the radiation grill unit does not necessarily include an energy storage and therefore does (advantageously not necessarily include a thermostat). The radiation grill unit may only have a power regulation including the options off=0% and on=100% power. However, in further embodiments the power regulation may also include (optional) settings with intermediate powers (for example 25%, 50%, 75% of full power). Especially, the heating element will not switch on and off during grilling, although this may of course also be possible in an embodiment. Hence, the grill unit may also include a power regulation configured for providing a variable power (to the radiation heater(s)).

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

Especially, the invention provides a radiation grill unit comprising (i) a grill grid with bars, the grill grid comprising a food support side and a radiation side, (ii) a radiation unit, especially comprising a reflector hosting an (electrical) IR radiation heater, wherein the radiation unit is configured to provide IR radiation in a direction of (the radiation side of) the grill grid, and optionally (iii) a radiation grill unit cavity configured to host a drip tray.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 6a-6c schematically depict some aspects, especially with respect to the drip tray; and FIGS. 7a-7c schematically depict some aspects; especially with respect to the radiation units and variations thereon. The illustration in FIG. 7a depicts a combined view of five configurations of reflector geometries of the radiation unit. FIGS. 7a(1)-7a(5) each depict an individual view of one configuration of reflector geometry taken from the combined view.

Where applicable, the (schematic) drawings are not necessarily on scale.

DETAILED DESCRIPTION OF THE EMBODIMENTS

Figure 1A:
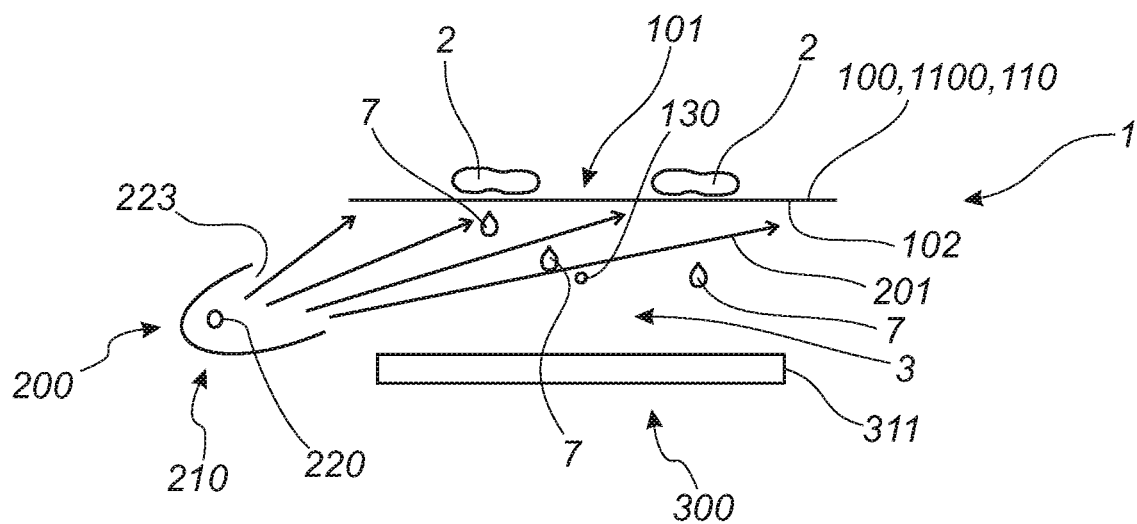
FIGS. 1a-1d schematically depict some aspects.

FIG. 1a schematically depicts an embodiment of a radiation grill unit 1. The radiation grill unit 1 comprises (i) a food support unit 100, here especially a grill grid 1100 with bars 110 (not individually depicted; see however below), (ii) a radiation unit 200 and (iii) a radiation grill unit cavity 3. The grill grid 1100 comprises a food support side 101 and a radiation side 102. By way of example, a food product 2 is depicted, which is arranged on the food support side 101 of the grill grid 1100. The radiation unit 200 comprises a reflector 210 hosting an (electrical) IR radiation heater 220. The reflector 210 comprises a reflector opening 223. For clarity reasons, the electrical infrastructure to provide power to the IR radiation heater 220 is not depicted. However, this is known to the person skilled in the art. Also a housing is not depicted for clarity reasons.

The radiation unit 200 is configured to provide IR radiation 201 in a direction of the radiation side 102 of the grill grid 1100. Here, by way of example only one radiation unit 200 is depicted. In general, at least a single set of two radiation unit 200 is applied, each providing radiation from opposite sides relative to the radiation grill unit cavity, and each configured to provide IR radiation 201 in a direction of the radiation side 102 (see also below). Further, the radiation grill unit cavity 3 configured to host a drip tray 300. Here, the drip tray is indicated to be present. However, the drip tray 300 is in general a removable item (like in general also the grill grid 1100 is).

Reference 311 indicates an edge of the drip tray 300. Within the edge(s) 311 of the drip tray, lipid droplets, indicated with reference 7, may be collected (see also below).

Figure 1B:
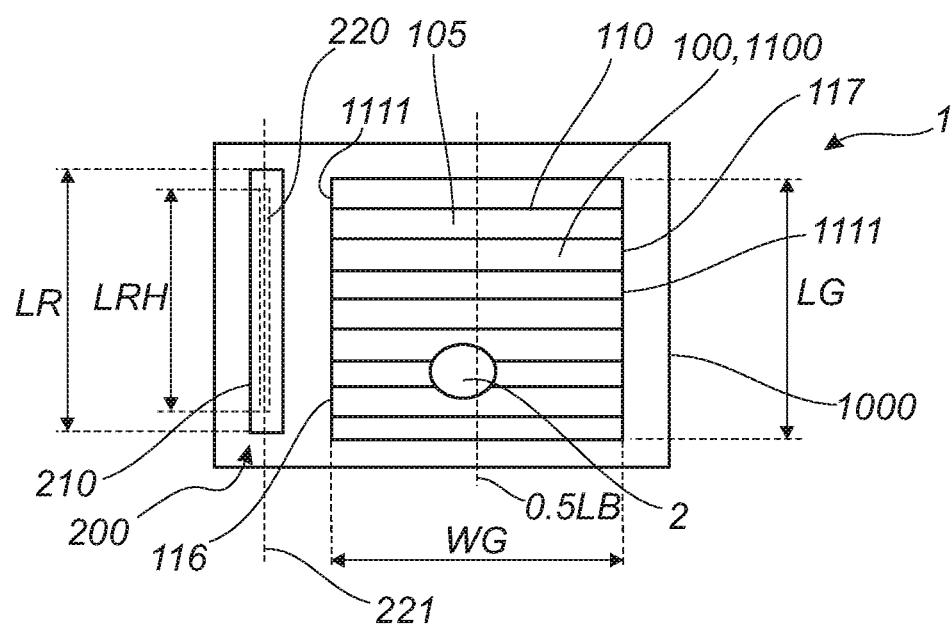

FIG. 1b schematically depicts a top view of the grill unit 1. Reference 221 indicates an axis of elongation of the IR radiation heater 220. As indicated above, in general the IR radiation heater 220 comprises a bar. As FIG. 1b shows, the grid 1100 especially refers to a 1D array of bars 110, and not to a 2D array of bars (with e.g. two sets of bars which are perpendicularly arranged to each other). References 116 and 117 indicate the ends of the bars 110 of the grid 100. At those ends, there may be connecting means to provide the set of parallel bars 110. These connecting means (having especially a length of about LG, see below) may also comprise bars. Note however, that when perpendicular connecting means are available, those means may be limited in number, such as only 2. Would intermediate connecting means (having especially a length of about LG, see below) be used, this number will in embodiments be smaller than the total number of bars such as 50% or less. For instance there may be less than 2 intermediate connecting means, like no intermediate connecting means. Herein, intermediate connecting means are not depicted as they may especially be absent. Hence, in embodiments the grill grid essentially consists of an (1D) array of parallel arranged grid bars Reference 1000 indicates a housing of the grill unit 1. Reference LR indicates the length of the radiation unit 100; reference LRH indicates the length of the IR radiation heater, which will in general only slightly smaller than the length LR of the radiation unit 100; reference LG indicates the length of grid 100; and reference WG indicates the width of the grid. The area WG*LG will (approximately) be the cross-sectional area of the grill grid 1100. Note that substantially all IR radiation, or especially substantially all direct IR radiation may impinge on the radiation side of the grill grid (and is thus distribution of this cross-sectional area). The plane of the grill grid 1100 is also indicated with reference 105. Note in FIG. 1b that the bars 110 are perpendicular to the IR radiation heater 110. Or, the grill bars 110 are in a plane parallel to the axis of elongation 221, with the bars perpendicular to such axis.

FIG. 1b also shows connecting means 1111 (having especially a length of about LG, see below), which may in an embodiment also comprise bars. The connecting means 1111, at the ends of the bars, provide together with the bars the grill grid. Note however, that when perpendicular connecting means are available, those means may be limited in number, such as only 2. As indicated above, would intermediate connecting means (having especially a length of about LG, see below) be used, this number will in embodiments be smaller than the total number of bars such as 50% or less. FIG. 1b shows an embodiment without intermediate connecting means. The bar ends are all connected to both connecting means. In this way, a 1D array of bars can be provided.

Figure 1C:
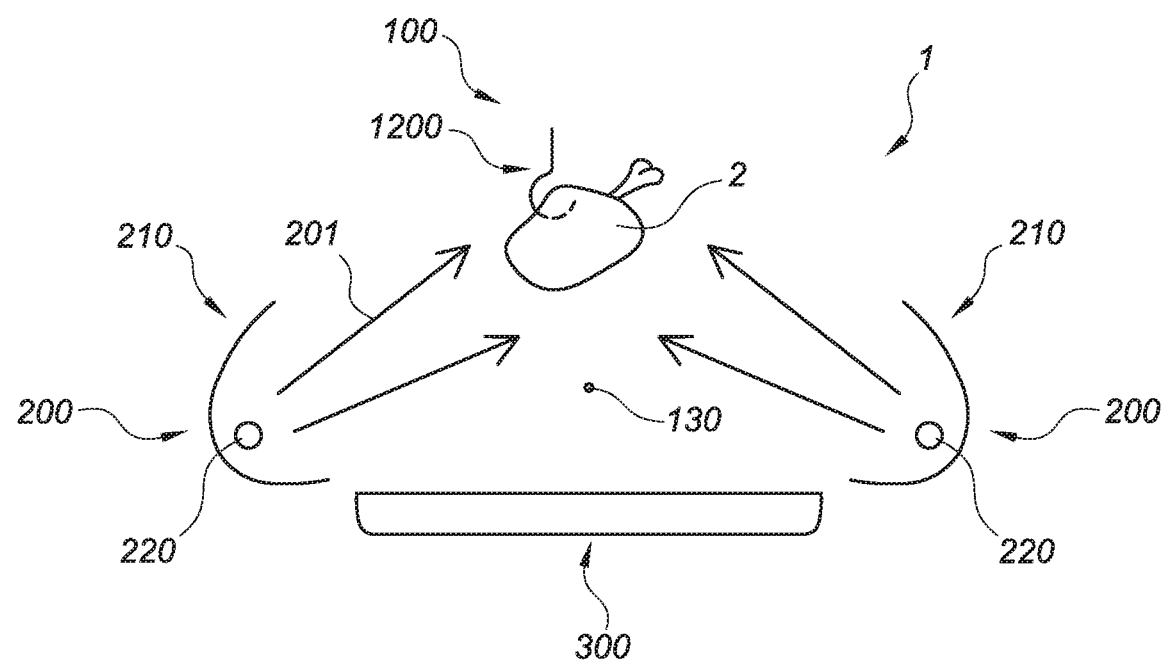
Figure 1D:
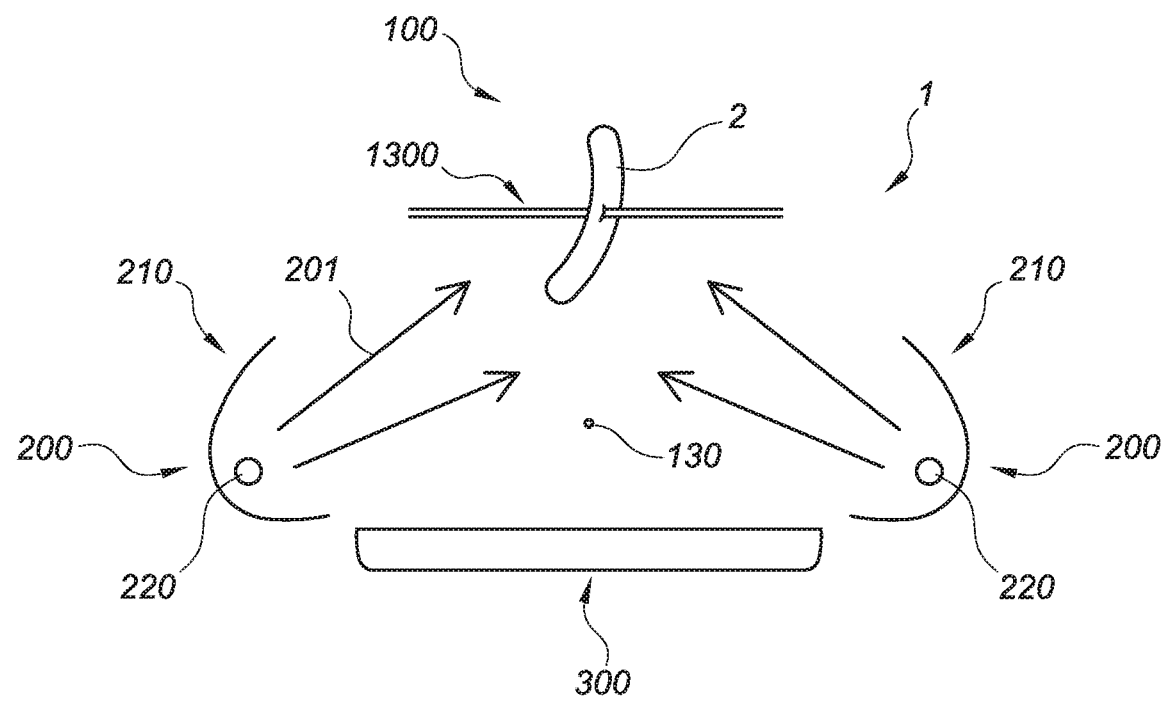

FIGS. 1c-1d schematically depict some alternative embodiments, wherein reference 1200 indicates a hook as embodiment of the food support unit 100, and wherein reference 1300 indicates a spit or skewer as embodiment of the food support unit 100. In both examples a food product 2 is arranged to the food support unit 100.

Figure 2A:
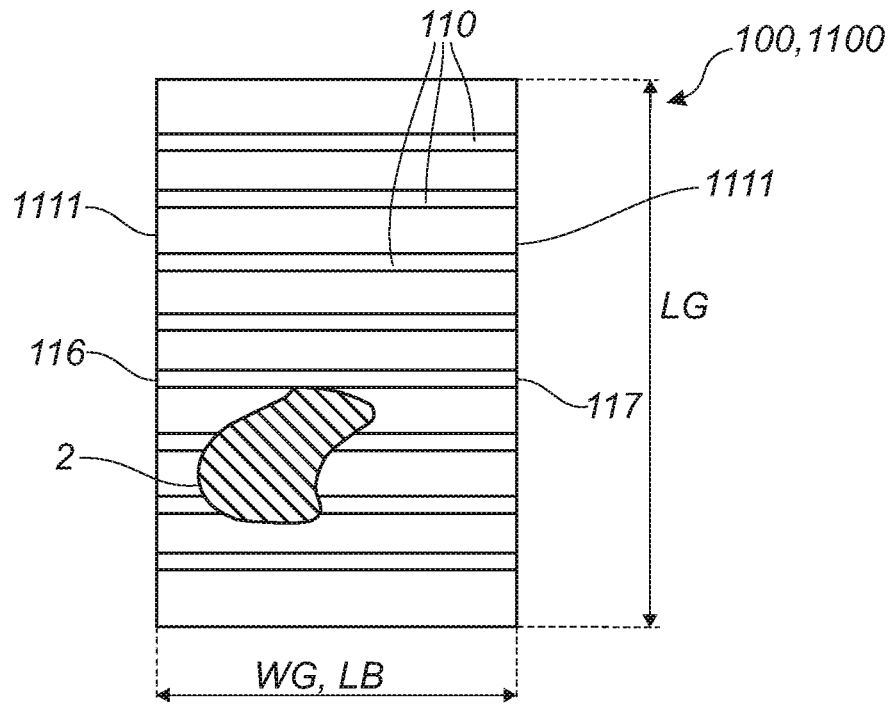
FIGS. 2a-2f schematically depict some aspects, especially with respect to grid dimensions.
Figure 2B:
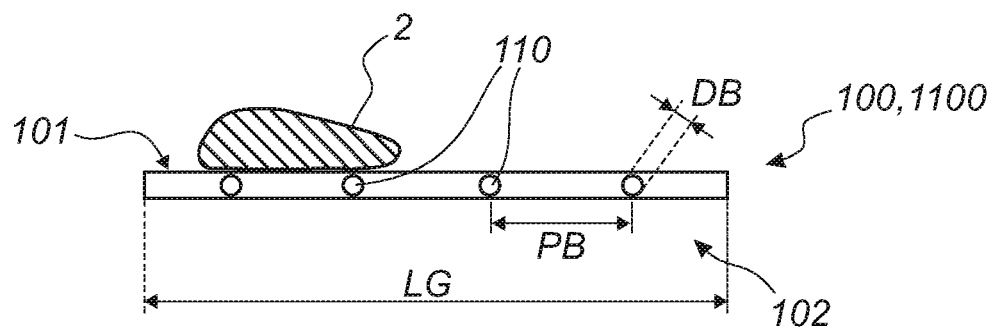

FIG. 2a schematically depicts in more detail the grill grid 1100, again with by way of example a piece of food (i.e. food product 2). FIG. 2a is a top view; FIG. 2b schematically depicts a side view, indicating the pitch or distance between the grill bars 110, which is indicated with reference PB (see FIG. 2b). The diameter of the bars 110 is indicated with reference DB (see FIG. 2b). Especially, the bars 110 have bar diameters DB and bar distances PB, wherein the bar diameters DB are selected from the range of 1-4 mm, and a ratio PB/DB between the bar distances PB and bar diameters DB is selected from the range of 2-10. The length of the bars 110 is indicated with reference LB (which can substantially be identical to the width of the grid WG).

A number of experiments were performed, of which some data are indicated below:

| Direction of bars | Thickness of bars | Pitch between bars | Absence of smoke |
|---|---|---|---|
| Longitudinal | 2.5 mm | 13 | + |
| Perpendicular | 2.5 mm | 13 | ++ |
| Perpendicular | 3 mm | 17 | ++ |
| Perpendicular | 4 mm | 13 | +/− |
| Perpendicular | 6 mm (∩-shape) | 13 | − |

Perpendicular bars with thicknesses in the range of 3 mm and a pitch of 17 mm gave the best results. Further, it appears that better results can be obtained with perpendicular bars. Here, perpendicular bars are bars that are "perpendicular" to an elongated radiation heater 220 (see FIG. 1b).

Figure 2C:
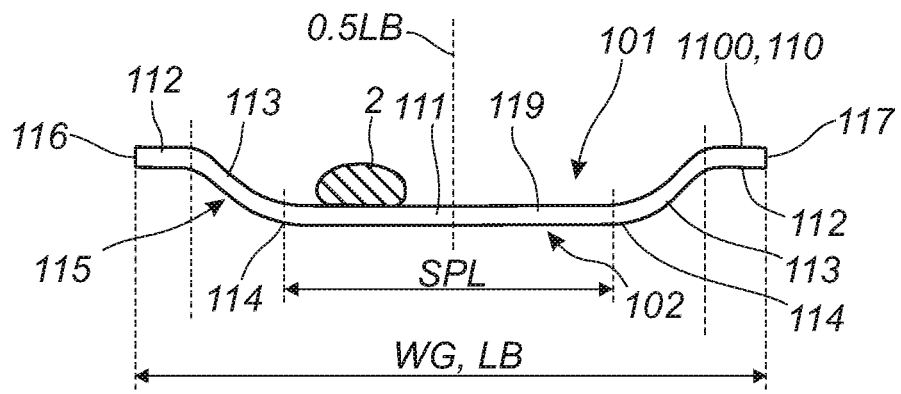
Figure 2D:
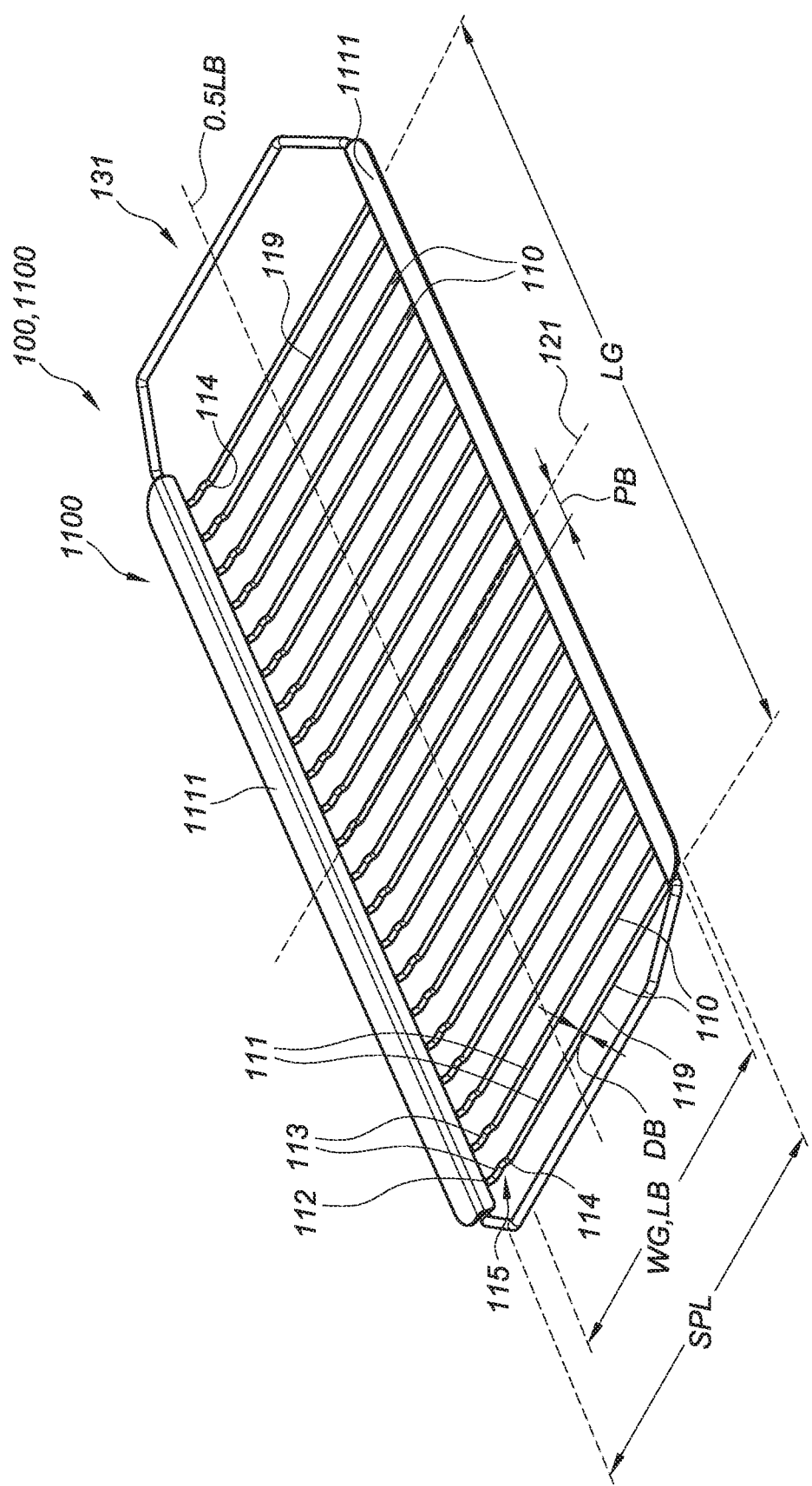

FIG. 2c schematically an embodiment wherein the bars 110 comprise sloping parts 115 configured to facilitate dripping of a lipid droplet 7 (not indicated in this schematic drawing, but see other drawings) into the drip tray (see also other drawings), wherein especially the sloping parts 115 are configured at one or more of a position within 0-10% and a position within 90-100% of the bar length LB. The bars 110 have a first end 116 and a second end 117 (defining the length of the bar LB, see also FIG. 2a), at end parts 112 and a bar support part 111 in between. On the bar support part 111 a food product may be arranged. Here, in this schematic embodiment the sloping parts 115 are comprised by curved parts 113, which are in this embodiment arranged between the bar support part and the end parts 112. The intermediate part, between the curved parts 113, is herein also indicated intermediate part 119. On this intermediate part the food product 2 can be arranged. The onset of the curved parts at the bars 110 at the radiation side 102 is indicated with reference 114. Especially at this position liquid lipid may gather, form (larger) droplets and fall down due to gravity. The length between the sloping parts 115 is indicated with reference SPL. Especially, this length SPL is shorter than the width of the drip tray 300 (see also FIG. 2e). In FIGS. 2c (and 2d) the bars 110 comprise intermediate parts 119 which are arranged lower relative to the bar end parts. This may advantageously automatically prevent arranging food products too close to the edge of the grill grid. FIGS. 2c & 2d show curvatures in the bars relative to a length axis of the bar(s).

FIG. 2d schematically depicts a specific embodiment of the drip tray 300, wherein the bars 110 comprise bar curves 113 which provide the sloping parts 115. Liquid material may migrate in a direction away from the grid ends 116,117 to the middle. Dripping in the drip tray may thereby be facilitated and dripping on a radiation unit, if possible in the configuration, is reduced or prevented. Reference 131 indicates a handle. In embodiments, a user may get the handle(s) and place or remove the grill grid 1100 in the grill unit.

Figure 2E:
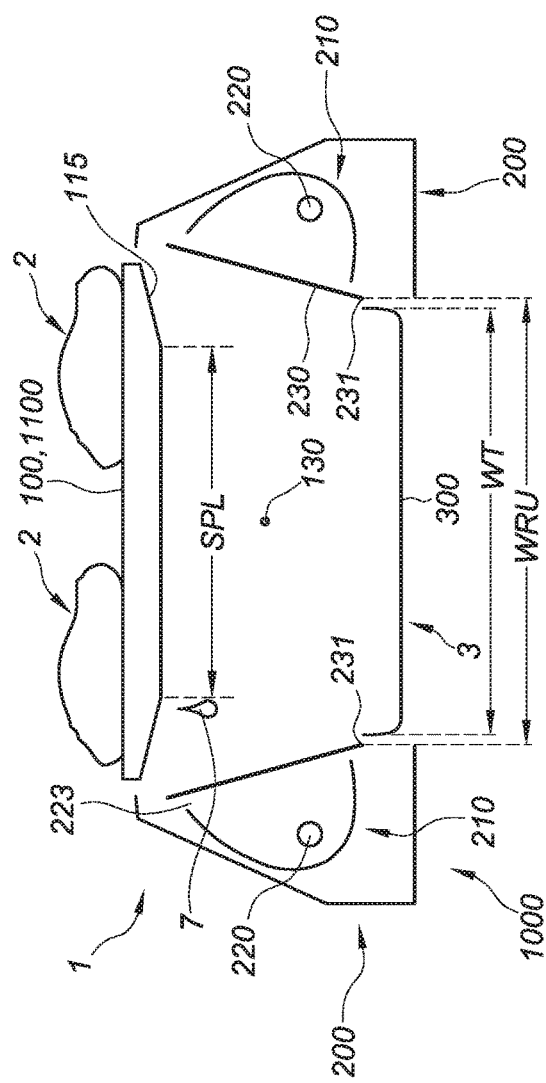

FIG. 2e schematically depicts a further embodiment, wherein it can be seen that the width of the tray 300, indicated with reference WT may be smaller than the smallest radiation unit distance, which is indicated with reference WRU (which is here especially the distance between lower edges 231 of the optional protective windows, indicated with reference 230), but may be chosen such that lipid droplets 7 may fall in the drip tray 300 (i.e. SPL<WT). FIG. 2e, and other figures, schematically depicts an embodiment wherein a set of two (oppositely arranged) radiation units 200 is applied.

For instance, in embodiments such as schematically depicted in e.g. FIGS. 2c-2f, SPL may be in the range of 160-210 mm, WRU may be in the range of 170-230 mm, and WT may be in the range of 180-230. Especially, WT>WRU>SPL. Note that in the embodiment schematically depicted in FIG. 2e, WT<WRU; however, this may thus also be the opposite, to further facilitate dripping in the drip tray 300 (see FIG. 3a).

Figure 2F:
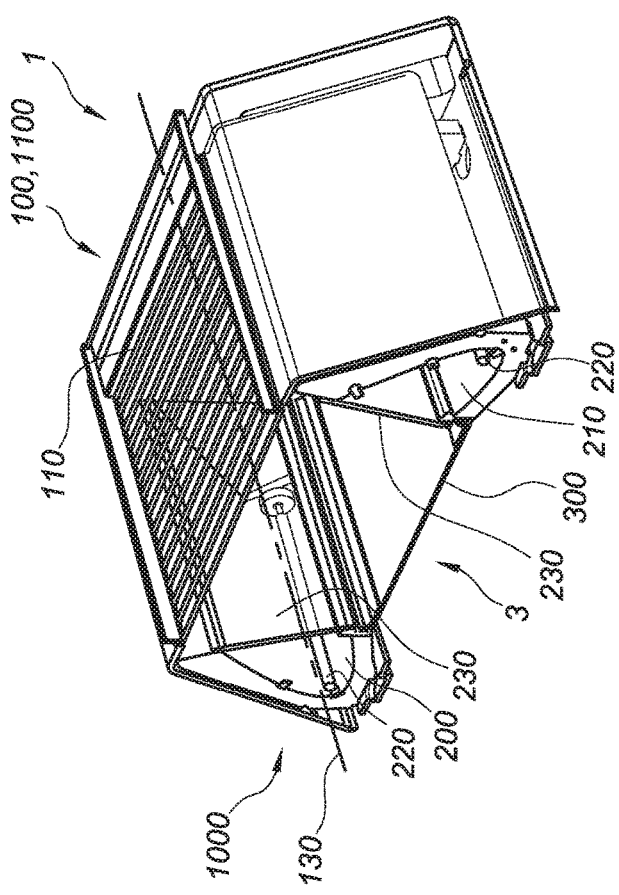

FIG. 2f schematically depicts a 3D figure of an embodiment of the grill unit 1. As indicated above, reference 230 indicates a protection window (see below).

The radiation grill unit cavity may at two edges be confined by edges. For instance, referring to FIG. 2e, the grill unit cavity 3 may substantially be confined by (two) radiation units 200 and by (two) walls or shields. FIG. 2f shows a 3D view; the front of the grill unit 1 may thus include a wall (the housing 1000 is drawn such that the interior can be seen). Especially, these walls are above the drip tray; optionally a reservoir may extend beyond such wall (when seen from the cavity 3; see also below)). In FIGS. 2e and 2f two radiation units, each at one side of the cavity is schematically depicted. Optionally, two or more sets of such radiation units may be applied, with each set radiation unit at both sides of the cavity (or of the drip tray).

Linear heaters radiate their (infrared) energy in all directions. However, the energy is only needed at the grill surface (the grid). All other parts of the grill should receive as little energy as possible, since part of the energy that those parts receive will be transformed into heat, which has to be cooled away to prevent excessive temperature rise.

The most important part in the grill that should be protected from radiation is the drip tray. This is the part that collects the fat dripping from the grilled food. When the drip tray becomes too hot (above approx. 150° C.), the fat starts to decompose (burn) and produce smoke. Smoke prevention is the main goal of the grill under discussion, so this needs to be avoided at any time. However, not only direct beams to the drip tray should be avoided. Beams that hit the opposite reflector can in certain circumstances be reflected downwards and reach the drip tray indirectly. Therefore, the goal is to prevent any infrared rays from hitting the opposite reflector. Traditionally, a reflector which has a predominantly parabolic shape (in cross section) would be chosen to convert omnidirectional radiation into a focused parallel beam. However, in the grill of the present invention, a parabolic shape with the desired optical functionality would need to be much too big to fit into the appliance. Especially the lower parts of the reflector would be in the path of the dripping fat.

Figure 3A:
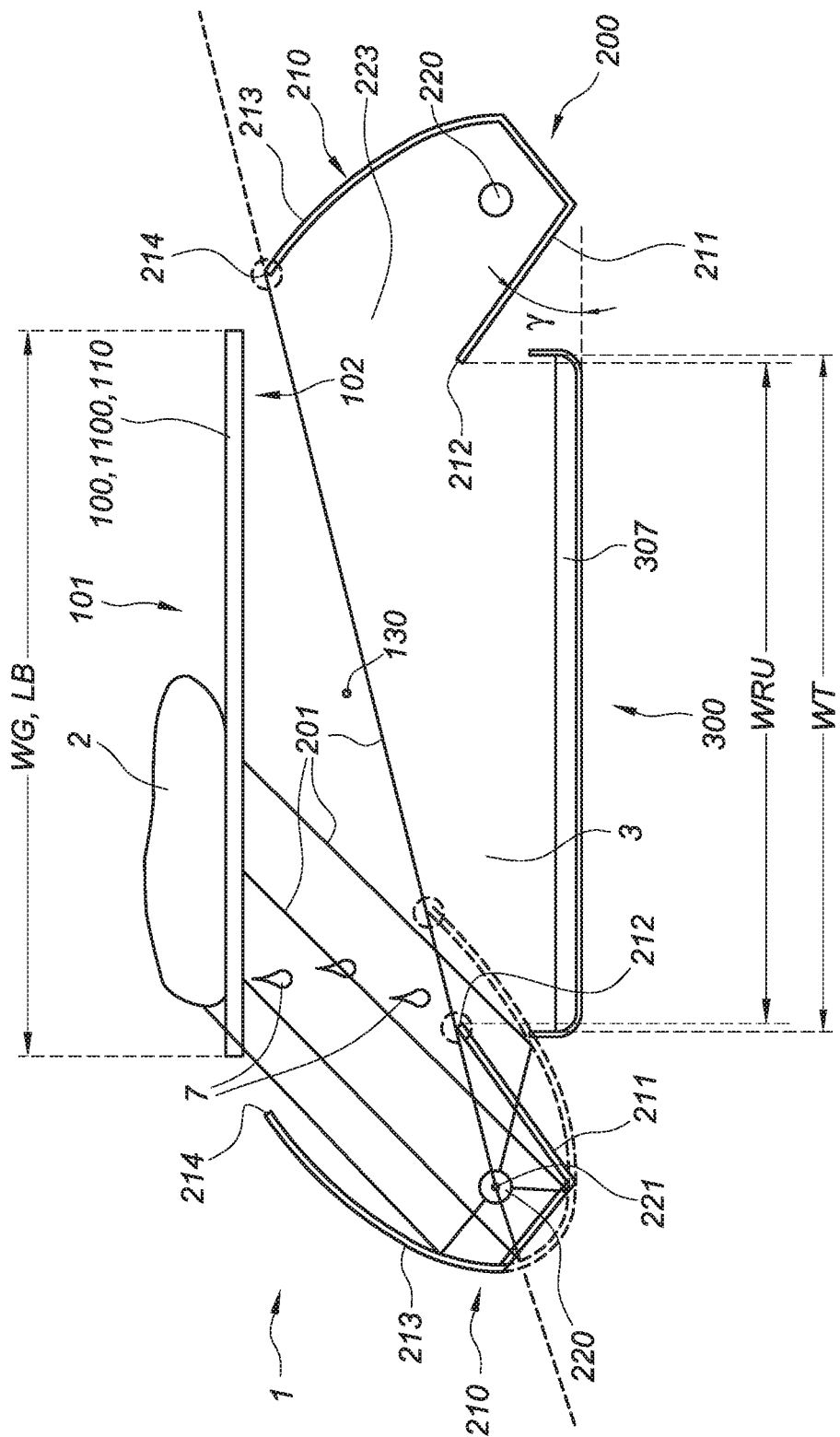
FIGS. 3a-3b schematically depict some aspects, especially with respect to radiation units.

Therefore, it in embodiments it is supposed to tweak the parabolic shape: on the bottom, the parabolic shape was replaced by straight segments with the same "shadow effect" for the opposite reflector, but much more compact; see FIG. 3a. Herein reference 211 indicates a lower part of the reflector 210 and reference 212 indicates a lower part edge; reference 213 indicates an upper part of the reflector 210 and reference 214 indicates an upper part edge. The lower part 211 and the upper part 213 may together form the reflector 210. The reflector may comprise (at the inner side) an aluminum coating. The shortest distance between the radiation units 200 is indicated with reference WRU, here especially the distance between the lower part edges 212 of the two oppositely arranged radiation units 200. Reference 307 indicates schematically collected (liquid) lipid (material), including optionally other material like carbon, food residues, water etc. etc. FIG. 3a also shows that a central axis or axis of elongation 221 of the radiation heater 220 of a first radiation unit (here the left one) is configured below a line through the upper reflector part edge 214 of the radiation heater 220 of a second radiation unit (here the right one) and the lower reflector part edge 212 of the first radiation unit. Of course, in a further embodiment, the entire radiation heater is below such line (thus even the upper edge of the radiation heater is below such line).

Figure 3B:
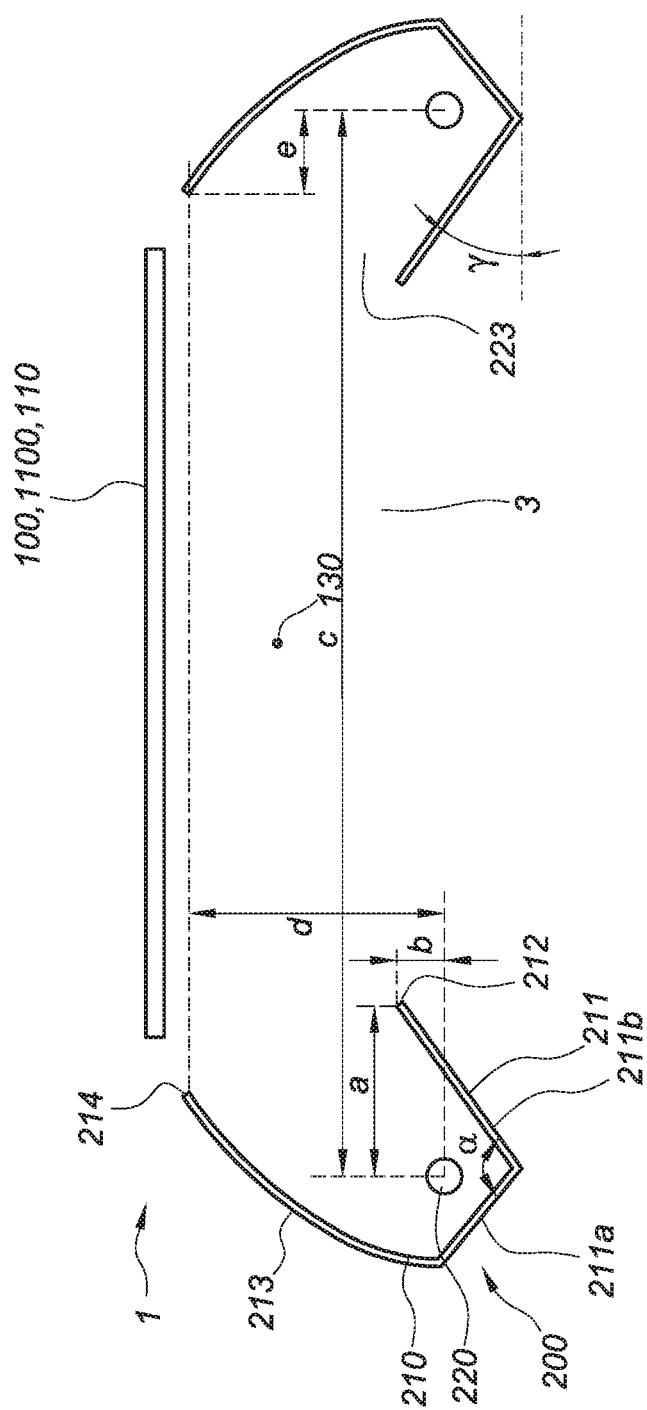

To achieve this "shadow effect", a few aspects must be carefully chosen in the design, especially with respect to the (relative) dimensions of the reflector. Looking at FIG. 3b, the following can be defined as specific embodiments:

The horizontal distance between the IR radiation heater 220 and the lower part edge 212 of the reflector 210 is defined as a, the vertical distance between these same points is b. The horizontal distance between both radiation heaters 220 is defined as c. The horizontal distance between the IR radiation heater 220 and the upper part edge 214 of the reflector 210 is defined as e. Ideally the relation between the dimensions should be:

$$a/b=(c-e)/d \qquad \text{Equation 1}$$

Or, rewritten:

$$a \times d = b(c-e) \qquad \text{Equation 2}$$

However, in practice, it can be difficult to achieve this exact relation, e.g. when the design needs to remain compact or other (design) requirements have to be fulfilled. In order to achieve more design freedom, some deviation from the relation described in equation 1 can be allowed. Our experiments have shown that especially good results may be obtained between about:

$$0.8 \leq (a \times d)/(b(c-e)) \leq 1.2 \qquad \text{Equation 3}$$

Note that the reflector 210 may also be configured with a lower part 211 with more than two faces or with a lower part including only one face. Further, the lower part 211 of the reflector, especially at the lower part edge 212 a tangent may have an angle $\gamma$ with a horizontal in the range of 10-45°, especially 10-40°, such as 15-35°.

Figure 4A:
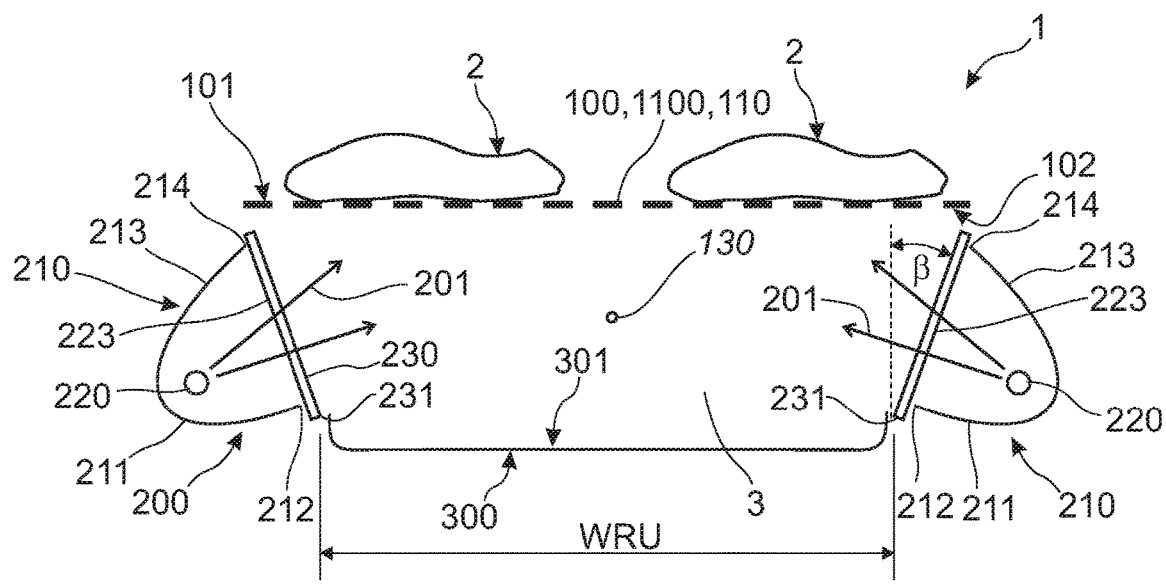
FIGS. 4a-4c schematically depict some aspects, especially with respect to a protective window.
Figure 4B:
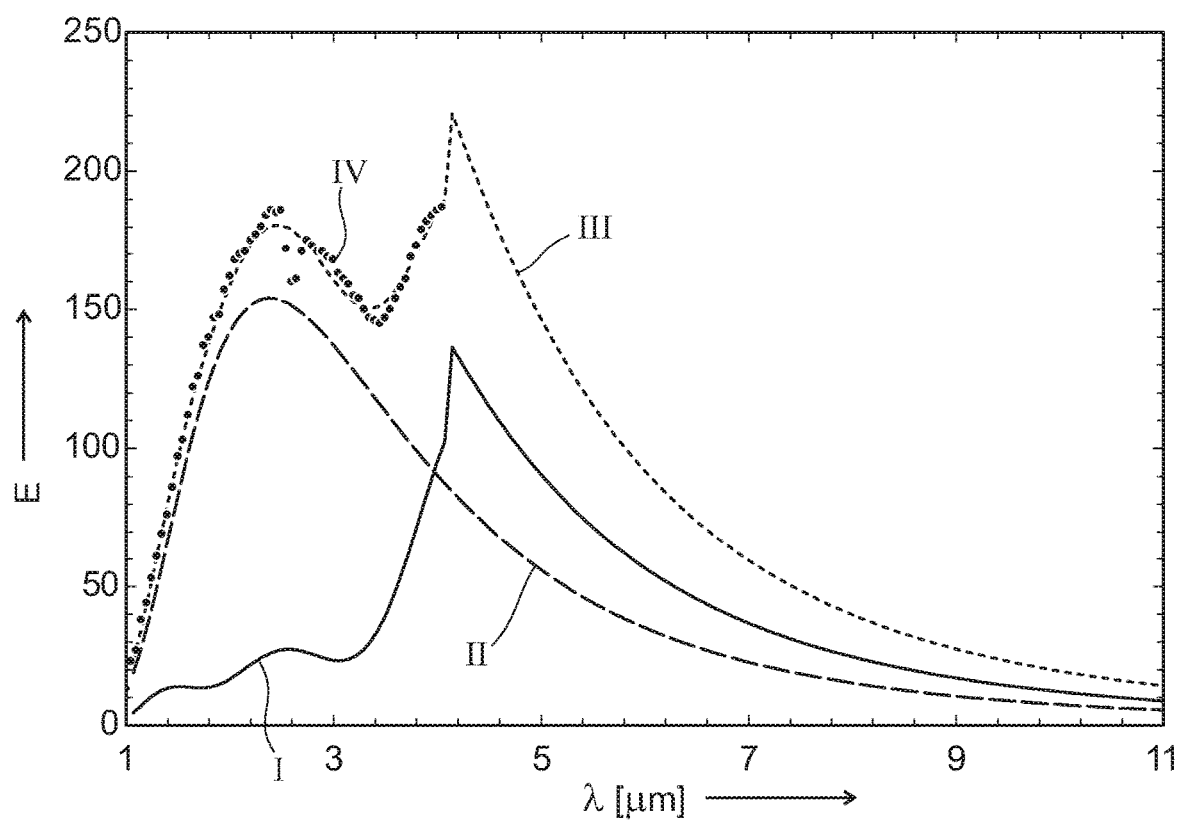

FIG. 4a schematically depicts an embodiment wherein the radiation unit 200 further comprises a protective window 230 which is transmissive for the IR radiation 201. Especially, the protective window 230 is arranged under an window angle $\beta$ selected from the range of 0<$\beta$≤60° relative to a normal to the grill grid 1100, even more especially selected from the range of 10≤$\beta$≤45°, such as 15≤$\beta$≤45°. Especially, the protective window 230 (essentially) closes off the (elongated) reflector opening 223.

The protective window 230 comprises a protective window lower edge 231. Further, the radiation grill unit 1 comprises here said drip tray 300. The protective window lower edge 231 may be configured above the drip tray face 301/drip tray 300. Note that in this schematic drawing this is not the case (however this is the case in FIG. 5a).

Note that the drip tray 300 in this invention is especially a removable drip tray, which can be slided into the radiation grill unit (such as in the housing 1000), and can be removed for e.g. cleaning.

The (smokeless) grill is designed to minimize the heat absorption by the grilling chassis or housing. This may amongst others be achieved by placing the heater at the sides of the chassis behind a glass cover/shield. Due to this placement a conventional heater—like a metal sheathed heater—may not (always be) possible due to its power/length. Thus especially a design is chosen to use heater wire wrapped around an electrical insulated coil, such as amongst others defined above. This coil can e.g. be made of quartz to withstand the high temperatures, although also other materials may be especially be chosen such as a ceramic material, like ceramic alumina. Such ceramic materials may withstand even higher temperatures. This design is able to generate the required 1000 W or so per 30 cm length available. A positive side effect is its fast heat up time. This heating coil wrapped around a quartz coil is only one of the three parts of the heater subassembly. The second part is the reflector placed around the heater at the rear side. This reflector is used to 'aim the heat' as good as possible towards the grilling area (and not to the chassis). The third part is the optional (glass) cover or window (made out of quartz, robax (glass ceramic) or other (substantially) zero expansion glasses or (aluminum-)borosilicate glasses), used to prevent spattering of meat juices onto the reflector or heater (clean-ability and performances). As indicated herein, the protective window may also be glass ceramic.

When the heater is powered the heating wire will increase in temperature, but because it's in solid contact with the quartz core or ceramic core this core will heat as well and will reach similar temperatures as the heating wire. Thus the heater consists of two radiation sources: the heating wire and the quartz coil or ceramic coil. The former will emit like a gray emitter. Quartz acts as a gray emitter too, but due to its transparency the radiation takes an odd form. Hardly any radiation can be emitted in the 1-4 micron range. The real emitting starts at 4 micron. The heating coil will transmit continuously. Especially, the heater includes a ceramic coil.

This spectrum is emitted direct—or via the reflector—towards the grilling area. But due to its quartz core a major part of the spectrum is located after the 4 micron. This implies—depending on the used glass shield—a major part of the energy is absorbed by the shield, heating the shield and resulting into a second heat source. But this heat source is not aimed by a reflector, thus the radiation is (assumed) randomly distributed. This means only a part is radiated towards the grill area and is called the view factor from shield to grill surface. Calculating this view factor results in 0.37 (thus 37% of the radiated energy of the shield reaches the grill surface directly. The other 63% is intercepted by the chassis and most likely absorbed or reflected at such small angles it will not couple with the food.

Figure 4C:
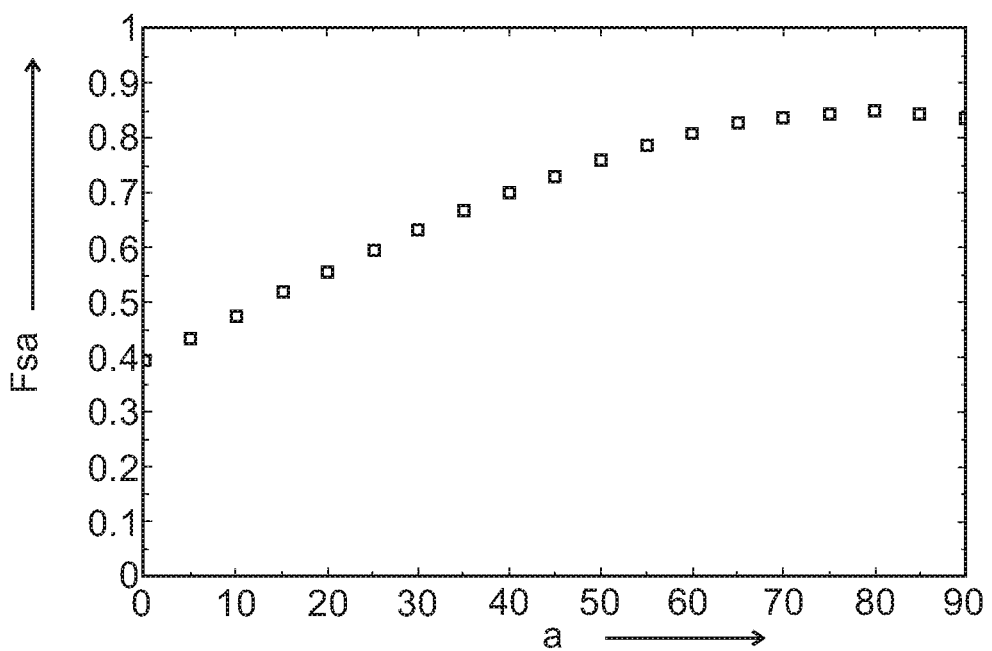

As shown in the picture above approx. 50% of the energy radiated from the heater reaches the grill surface direct—if reflector is designed well—and 50% is absorbed by the glass shield. From this latter 50%, 37% (thus 50%*37%=18.5%) reaches the grill surface resulting in an overall efficiency of 68.5%. Better efficiencies can be achieved by increasing the view factor by tilting the glass a bit. The view factor is calculated by means of Hottel's string rule and looks like the curve in FIG. 4c: Fsa=view factor shield to grill area; and a=angle (0° means perpendicular to grill surface, and 90° is in same plane as grill area).

Thus placing the shield at an angle of 30° enhances the view factor from 0.37 to 0.63, resulting into 82% efficiency. Note that these calculations assume that: (1) the reflector is optimal (100% of heater spectrum aimed at grill surface); and (2) the absorbed energy of the glass shield is emitted (except some convection losses), but is not lost via the chassis (suspension of the glass) or additional cooling of the glass shield).

Reference I indicates the radiation emitted by the quartz tube; reference II indicates the radiation emitted by the coil; reference III indicates the total emission of the heater; reference IV indicates the measured data which substantially confirm the curve III. On the x-axis the wavelength in μm is indicated; on the y-axis relative intensities are indicated.

Note that a lower part edge of the reflector may penetrate the grill cavity more than the upper part edge of the reflector. Assuming two oppositely arranged radiation units, the shortest distance between the lower part edges of the two opposite radiation units will in general be shorter than the shortest distance between the upper part edges of the same two opposite radiation units. Especially, the lower part edge of the reflector may have a shortest (horizontal) distance to a central point 130 in the grill cavity that is shorter than a shortest (horizontal) distance from the upper part edge of the reflector to the central point 130 in the grill cavity.

Figure 5A:
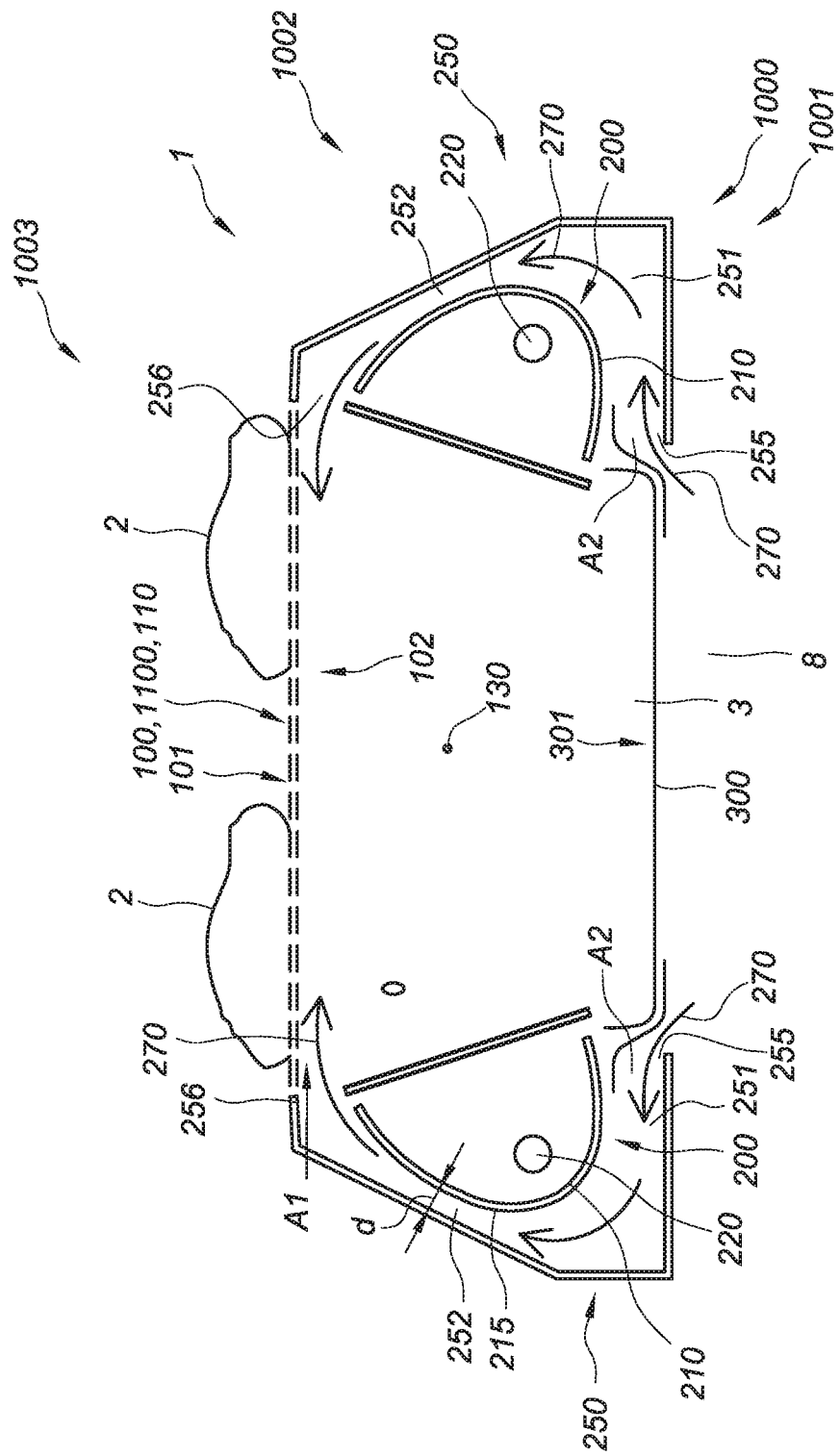
FIGS. 5a-5b schematically depict some aspects, especially with respect to convection channel.

FIG. 5a schematically depicts an embodiment (in cross-section) comprising a radiation unit housing 250 with a radiation unit housing cavity 251 configured to host the radiation unit 200. The radiation unit housing 250 is constructed in such a way that this radiation unit housing 250 further comprises a convection channel 252 configured to facilitate free convection of air along the radiation unit 200. Flow of air is indicated with reference 270.

The radiation unit housing 250 comprises a radiation unit housing lower opening 255 and a radiation unit housing upper opening 256 defining a first end and a second end of the convection channel 252. Relative cooler air enters radiation unit housing lower opening 255, is being heated, rises, and leaves the convection channel 252 radiation unit housing upper opening 256 (in the direction of the radiation side 102 of the grill grid 1100. This may lead to an additional heating. Here, the radiation unit housing 250 comprises a convection channel 252 configured to facilitate free convection of air along the (back side (reference 215) of the reflector (of the) radiation unit 200. Note that in embodiments there may be a separate radiation unit housing 250 integrated in housing 1000, whereas in other embodiments the housing 1000 may include the functionality of a radiation unit housing (which may in fact be the case in the schematically depicted embodiment of FIG. 5a). Here, but this may also apply to other embodiments, the housing 1000 further comprises a housing opening 8 for influx of air.

Figure 5B:
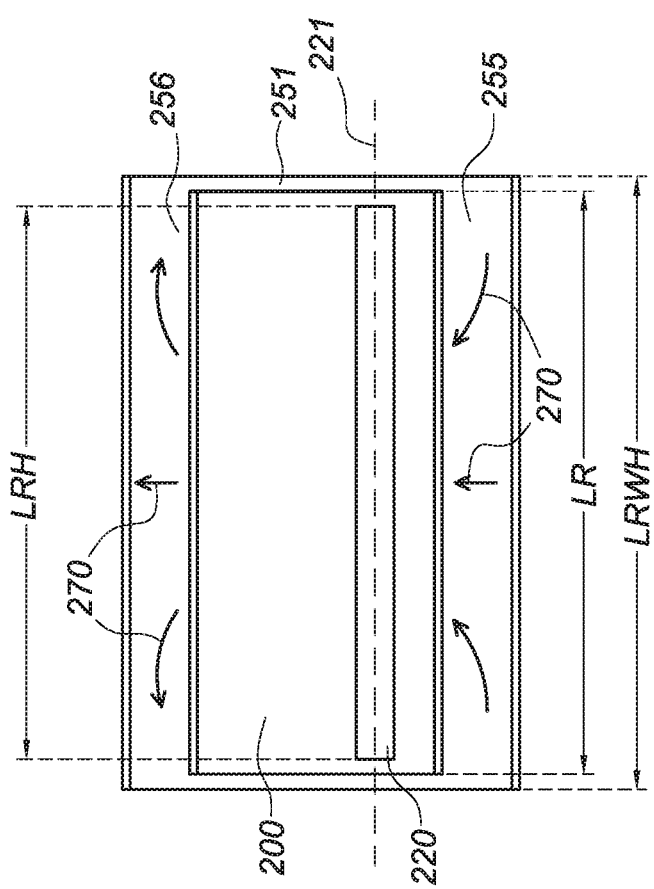

FIG. 5b schematically depicts a view of this housing when seen from the food support unit, especially seen from the grill grid, to the radiation unit 200. The radiation unit housing upper opening 256 comprises a cross sectional upper opening area (A1) and the radiation unit housing lower opening 255 comprises a cross sectional lower opening area (A2). Experimentation showed that better cooking results (cooked food product quality, cooking time, efficiency) were obtained when the convection channel 252 has a ratio of the cross sectional upper opening area (A1) to the cross sectional lower opening area (A2) selected from the range of $0.8 \leq A1/A2 \leq 4$.

Figure 6A:
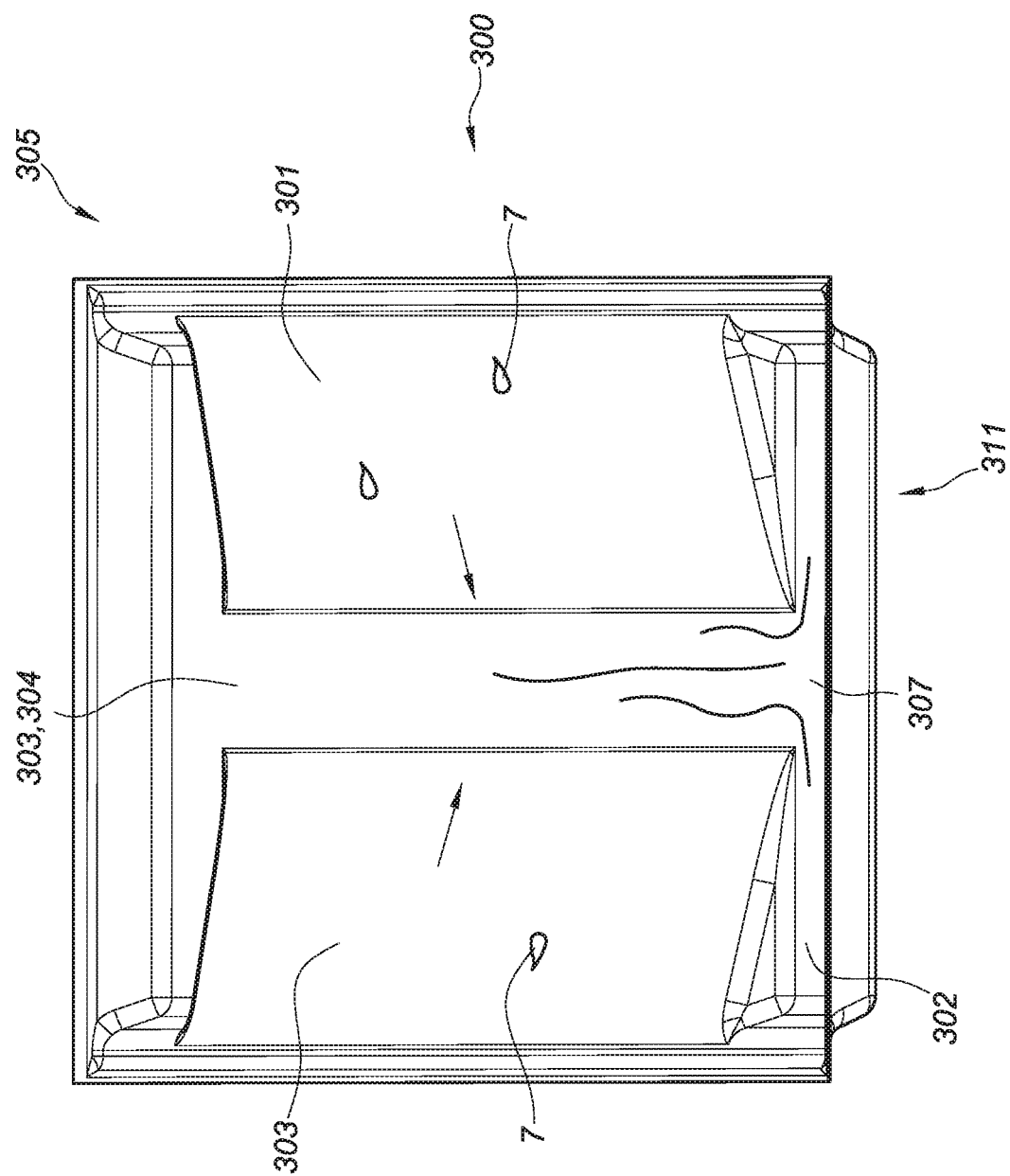
Figure 6B:
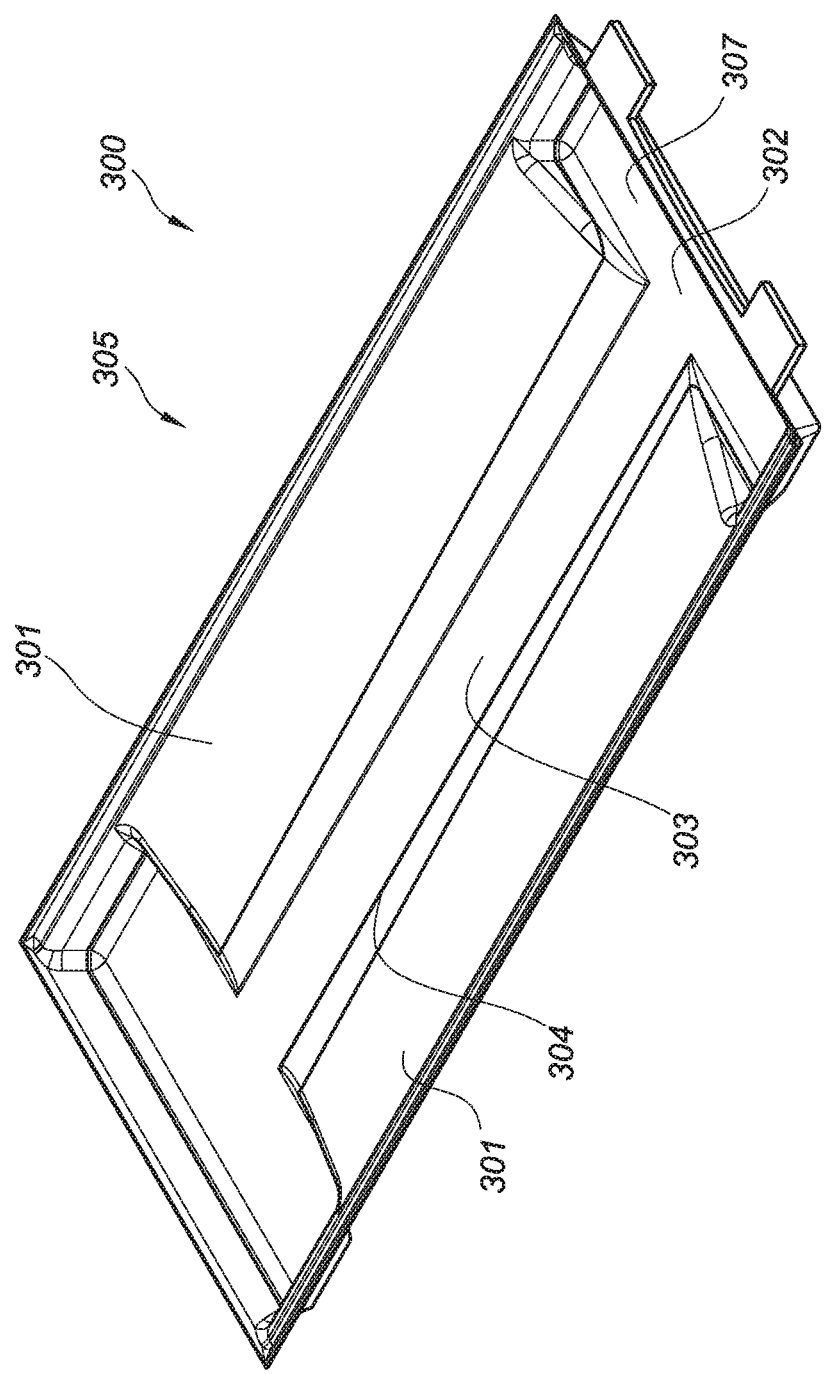

FIGS. 6a-6c schematically depicts some embodiments of a drip tray 300. Such drip tray may be used in the present grill unit 1, but may also be used in other cooking systems. In the present invention, the drip tray 300 is especially configured in the radiation grill unit cavity 3 out of the line of sight of direct IR radiation 201 from the radiation heater 220, see FIGS. 1a, 2e-2f, 3a, 4a, and 5a. The drip tray 300 comprises a drip tray face 301 and a drip tray reservoir 302 configured at an edge 311 of the drip tray 300. The drip tray reservoir is especially configured to (temporarily) store a lipid comprising liquid 307. Further, here the drip tray face 301 comprises collection means 303 configured to guide the lipid comprising fluid 307 from the drip tray face 301 to the drip tray reservoir 302. Here the collection means 303 include a V-shaped drip tray face 301 (and a collection channel 304). This (these) facilitate collection of liquid in the drip tray reservoir 302. The drip tray face 301 may include one or more flat parts, but may alternatively or additionally also include one or more curved parts. In the herein depicted embodiment, two drip tray reservoirs 302 may be available. In use, especially the drip tray 300 is arranged below the food support unit, such as a grill grid, with the radiation units at both sides, and with the drip tray reservoir at the other edges (in FIG. 6a this would imply that the radiation units are configured at the left and the right side/edge of the drip tray 300). FIG. 6b schematically depicts a 3D view of an embodiment of the drip tray 300 of FIG. 6a. FIG. 6c schematically depicts an embodiment with one or more curved parts. Here a drip tray face 301 is applied with a kind of saddle shape. The saddle shape is indicated with reference 306.

FIG. 6a schematically depicts a perspective top view of the drip tray 300. When arranged in the radiation grill unit 1, the radiation units may be at the left and right side, and edges of the cavity 3 may be over the reservoir(s) 302, and may especially over the drip tray face 301, but close to the reservoir(s) 302. In this way, dripping liquid may fall on the drip tray face 301 and be collected via collection means 303 into the reservoir 302.

Figure 7B:
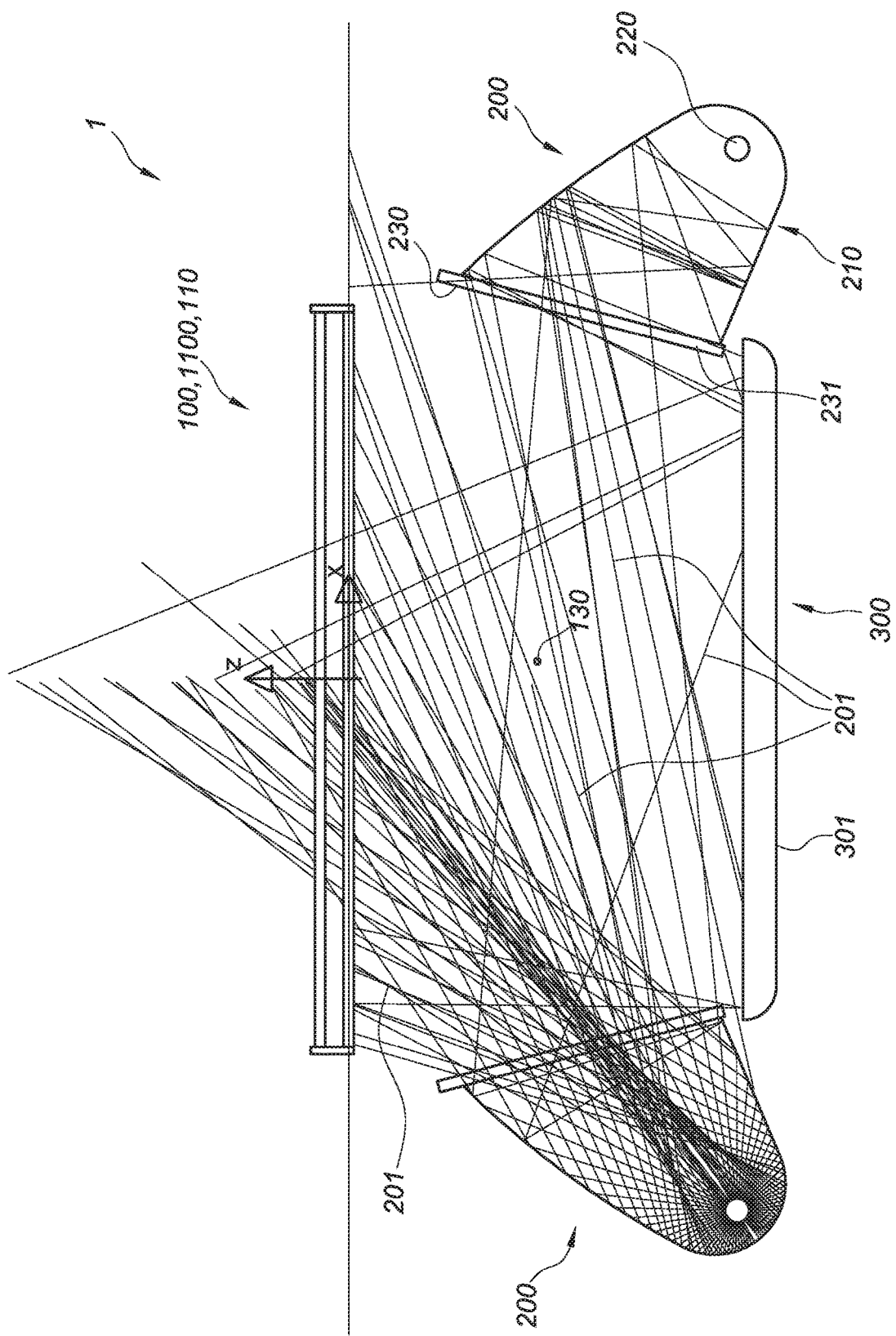
Figure 7C:
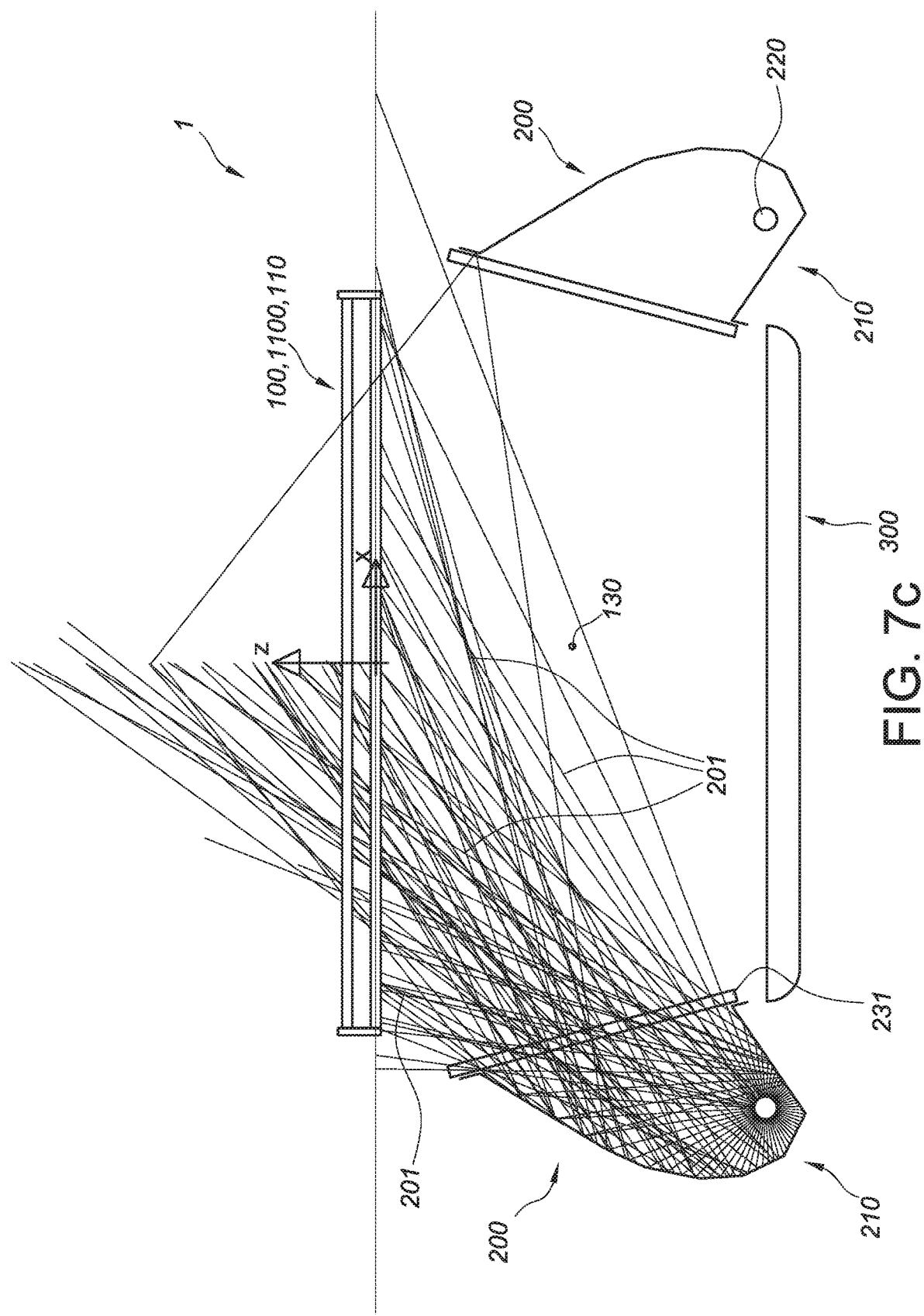

FIGS. 7a-7c schematically depict some aspect of the radiation unit again. FIG. 7a schematically depict a number of the configuration of the radiation unit 200 that were investigated. Here, five configurations are depicted (H3, H4, H5.0, H5.2, H7.2). The position of the radiation heater of configurations H4 and H5.0 overlap. Here, all radiation units comprise a protective window 320. Below some data are given of reflector shapes that were tested/simulated, of which some are depicted in FIGS. 7a-7c. In addition, note that FIGS. 7a(1)-7a(5) each depict an individual view of one configuration of reflector geometry taken from the combined view of FIG. 7a.

|  | H 3 | H 4 | H 5.0 | H 5.2 | H 6.1 | H 7.2 |
|---|---|---|---|---|---|---|
|  | Construction | | | | | |
| Glass Angle β | 0° (vert.) | 0° (vert.) | 15° | 15° | 23° | 20° |
| a*d/(b*(c − e)) | 6.0 | −2.8 | 4.0 | 1.0 | 0.6 | 1.0 |
| WRU | minimal | minimal | minimal | minimal | maximal | intermediate |
|  | Prototype Testing | | | | | |
| Wattage | high | high | medium | low | low | low |
| Grill Performance | + | + | ++ | +++ | + | +++ |
| Drip Tray Temperature | --- | -- | - | + | ++ | +++ |

-continued

|  | H 3 | H 4 | H 5.0 | H 5.2 | H 6.1 | H 7.2 |
|---|---|---|---|---|---|---|
| Simulation values With glass + reflection on glass 10% + absorption 30% | | | | | | |
| Watt at grid |  |  |  | ++ | ++ | ++ |
| Drip tray staying cool |  |  |  | + | ++ | +++ |
| Remarks: | | | | | | |
|  | small inefficient reflectors, active ventilation necessary. Vertical window | parabolic shaped reflectors, lower reflector part edge lower than heating element | first glass at angle | improved reflector shape (straight lower reflector part) | small reflector with max. WRU | WRU < grid width --> special grid with drip positioning not above the glass |

FIG. 7b shows a 2D-simulation (only direct radiation) perpendicular to the heating element of a reflector without a straight lower reflector part (such as configuration H5.0) that gives a shadow on the reflector on the opposite side. In FIG. 7b, the radiation of only one heating element is visible (i.e., illustrated). Furthermore, as shown in FIG. 7b, a part of the direct radiation from the heating element of the first reflector will be reflected via the second reflector on the opposite side into the drip tray, which will be heated up and may cause smoke after a while. In contrast, FIG. 7c shows a 2D-simulation (only direct radiation) perpendicular to the heating element of a reflector with a straight lower reflector part (such as configuration H5.2) that gives a shadow on the reflector on the opposite side. In FIG. 7c, there will be no direct radiation that ends up in the drip tray. Therefor the drip tray, as shown in the embodiment of FIG. 7c, may stay much cooler. Smoke formation may be reduced or prevented.

Many of the drawings above elucidated different aspects that are not necessarily combined. For instance information about a drip tray may relate to the specific drawing but such embodiment of the drip tray may also be applied in other embodiments, for instance where an optimized grill grid is described and/or depicted, or wherein an optimized convection system is described and/or depicted, or wherein an optimized protective window configuration is described and/or depicted, or wherein an optimized configuration of a set of radiation units is described and/or depicted, etc.

The invention claimed is:

1. A radiation grill unit for grilling food in an open grill arrangement, the radiation grill unit comprising:
   a food support unit;
   two radiation units configured to provide IR radiation in a direction of the food support unit, wherein each radiation unit comprises a reflector that comprises an upper part having a parabolic shape with an upper part edge and a lower part with a lower part edge, wherein the lower part includes at least one lower part surface selected from the group consisting of (a) only one lower part surface, (b) two lower part surfaces, and (c) three lower part surfaces, wherein each lower part surface of the at least one lower part surface includes a flat shape, further wherein the lower part surface at the lower part edge of the lower part of the reflector forms a tangent angle γ with a horizontal line that is in a range selected from the group consisting of 10-45°, 10-40°, and 15-35°, wherein the reflector is further configured (i) to host an IR radiation heater and (ii) to reflect IR radiation from the IR radiation heater to the food support unit; and
   a radiation unit housing with a radiation unit housing cavity configured to host the two radiation units opposite each other at opposite sides of the radiation unit housing cavity, at respective opposite side edges of the food support unit, wherein the lower part edge of the reflector of each radiation unit of the two radiation units is spaced closer, horizontally, to a center point of the radiation unit housing cavity than the upper part edge of the respective reflector, wherein the radiation unit housing further comprises two convection channels, each convection channel formed between the reflector of each radiation unit of the two radiation units and an inner surface of the radiation unit housing, wherein the radiation unit housing further comprises a lower opening below the lower part edge of the reflector of each radiation unit of the two radiation units and an upper opening above the upper part edge of the reflector of each radiation unit of the two radiation units to define a lower end and an upper end, respectively, of each convection channel of the two convection channels, and wherein responsive to the reflector of each radiation unit of the two radiation units becoming heated via IR radiation, free convection of air is facilitated, from below the lower part edge to above the upper part edge of the reflector of a respective radiation unit of the two radiation units, along the reflector of the respective radiation unit within a respective convection channel, and
   wherein the reflector of each respective radiation unit of the two radiation units is further configured to block, via the lower part surface of the lower part of each reflector at the respective lower part edge, direct IR radiation from a respective IR radiation heater of a respective radiation unit of the two radiation units that would otherwise be disposed in a line of sight to (i) a region of the radiation unit housing cavity directly underlying the food support unit, below a level of each radiation unit of the two radiation units and (ii) the reflector of an opposite radiation unit of the two radiation units.

2. The radiation grill unit according to claim 1, wherein the food support unit comprises a grill grid with bars, wherein the grill grid comprises a food support side and a radiation side, or wherein the food support unit comprises one or more selected from the group of a spit, a skewer, a clamp, and a hook.

3. The radiation grill unit according to claim 1, wherein the lower part edge of the reflector of each radiation unit of the two radiation units is spaced horizontally closer to a center point of the radiation unit housing cavity than the upper part edge of the respective reflector, wherein further each convection channel of the two convection channels is formed between (i) a back side of the reflector of a respective radiation unit of the two radiation units, opposite to a front side of the reflector that reflects IR radiation in the direction of the food support unit, and (ii) the inner surface of the radiation unit housing, and wherein responsive to the reflector of a respective radiation unit of the two radiation units becoming heated via IR radiation, free convection of air is facilitated, from below the lower part edge to above the upper part edge of the reflector of the respective radiation unit of the two radiation units, along the back side of the reflector within the respective convection channel.

4. The radiation grill unit according to claim 1, further comprising a radiation grill unit cavity configured to host a drip tray.

5. The radiation grill unit according to claim 4, wherein the drip tray is configured in the radiation grill unit cavity below the lower part edge of the reflector of each radiation unit of the two radiation units and out of a line of sight of direct IR radiation from the IR radiation heater of each radiation unit of the two radiation units, further wherein the drip tray comprises a drip tray face and at least one drip tray reservoir, wherein the at least one drip tray reservoir is configured at a side edge of the drip tray in a location that does not receive direct IR radiation, and configured to store a lipid comprising liquid.

6. The radiation grill unit according to claim 5, further comprising:
a protective window, transmissive for the IR radiation, for each of the two radiation units, wherein each protective window is arranged in front of a reflector opening of a respective radiation unit, between the respective radiation unit and radiation grill unit cavity, each protective window further being at an angle ($\beta$) relative to a normal to a food support surface of the food support unit, with $\beta > 0°$, wherein each protective window further comprises a lower edge that is (a) configured above the drip tray face, and (b) horizontally extends within an inner horizontal width dimension of the drip tray face more than an upper edge of the respective protective window.

7. The radiation grill unit according to claim 6, wherein the protective window comprises one selected from the group consisting of glass, glass ceramic, and quartz.

8. The radiation grill unit according to claim 1, further comprising:
a grill grid with bars, wherein the grill grid comprises a food support side and a radiation side, wherein each radiation unit of the two radiation units is configured to provide IR radiation in a direction of the radiation side of the grill grid.

9. The radiation grill unit according to claim 1, wherein the radiation unit housing upper opening is configured to facilitate directing a flow of air escaping from the radiation unit housing upper opening in a direction of a radiation side of the food support unit.

10. The radiation grill unit according to claim 1, wherein the radiation unit housing upper opening comprises a cross sectional upper opening area (A1) and wherein the radiation unit housing lower opening comprises a cross sectional lower opening area (A2), and wherein a ratio of the cross sectional upper opening area (A1) to the cross sectional lower opening area (A2) is within a range of $0.8 \leq A1/A2 \leq 4$.

11. The radiation grill unit according to claim 1, wherein each radiation unit of the two radiation units has a radiation unit length (LR), wherein the radiation heater of each radiation unit of the two radiation units has a radiation heater length (LRH) and wherein the radiation unit housing cavity has a radiation unit housing length (LRUH), wherein a ratio of the radiation heater length to radiation unit length is within a range of $0.9 \leq LRH/LR < 1$, and wherein a ratio of the radiation unit length to radiation unit housing length is within a range of $0.9 \leq LR/LRUH \leq 1$.

12. The radiation grill unit according to claim 1, further comprising: a separate housing configured to host the radiation unit housing within the separate housing, wherein the separate housing comprises a housing opening at a bottom thereof for influx of air.

13. The radiation grill unit according to claim 1, wherein the food support unit comprises a grill grid with bars, wherein the grill grid comprises a food support side and a radiation side, wherein the bars each have a bar diameter (DB) and a distance (PB) between adjacent bars, wherein the bar diameter (DB) comprises a diameter in a range of 1-4 mm, and wherein a ratio PB/DB between (i) the distance between adjacent bars (PB) and (ii) the bar diameter (DB) is within a range of $2 \leq PB/DB \leq 10$.

14. The radiation grill unit according to claim 1, wherein each of the two radiation units is configured to provide IR radiation in a direction of a radiation side of the food support unit and to distribute the IR radiation evenly over the radiation side of the food support unit.

15. A method for cooking a food product via the radiation grill unit according to claim 1, the method comprising:
arranging the food product onto the food support unit of the radiation grill unit; and
providing IR radiation to the food product.

16. A radiation grill unit for grilling food in an open grill arrangement, the radiation grill unit comprising:
a food support unit;
two radiation units configured to provide IR radiation in a direction of the food support unit, wherein each radiation unit comprises a reflector that comprises an upper part having a parabolic shape with an upper part edge and a lower part with a lower part edge, wherein the lower part includes at least one lower part surface selected from the group consisting of (a) only one lower part surface, (b) two lower part surfaces, and (c) three lower part surfaces, wherein each lower part surface of the at least one lower part surface includes a flat shape, further wherein the lower part surface at the lower part edge of the lower part of the reflector forms a tangent angle $\gamma$ with a horizontal line that is in a range selected from the group consisting of 10-45°, 10-40°, and 15-35°, wherein the reflector is further configured (i) to host an IR radiation heater and (ii) to reflect the IR radiation from the IR radiation heater to the food support unit; and
a radiation unit housing with a radiation unit housing cavity configured to host the two radiation units opposite each other at opposite sides of the radiation unit housing cavity, at respective side edges of the food support unit, wherein the lower part edge of the reflector of each radiation unit of the two radiation units is spaced closer, horizontally, to a center point of the radiation unit housing cavity than the upper part edge of the respective reflector, wherein the radiation unit housing further comprises two convection channels, each convection channel formed between the reflector of each radiation unit of the two radiation units and an inner surface of the radiation unit housing, wherein the radiation unit housing further comprises a lower opening below the lower part edge of the reflector of each radiation unit of the two radiation units and an upper opening above the upper part edge of the reflector of each radiation unit of the two radiation units to define a lower end and an upper end, respectively, of each convection channel of the two convection channels, and wherein responsive to the reflector of each radiation unit of the two radiation units becoming heated via IR radiation, free convection of air is facilitated, from below the lower part edge to above the upper part edge of the reflector of a respective radiation unit of the two radiation units, along the reflector of the respective radiation unit within a respective convection channel, wherein the reflector of each respective radiation unit of the two radiation units is further configured to block, via the lower part surface of the lower part of each reflector at the respective lower part edge, direct IR radiation from a respective IR radiation heater of a respective radiation unit of the two radiation units that would otherwise be disposed in a line of sight to (i) a region of the radiation unit housing cavity directly underlying the food support unit, below a level of each radiation unit of the two radiation units and (ii) the reflector of an opposite radiation unit of the two radiation units, and wherein each of the two radiation units is configured to provide IR radiation in a direction of a radiation side of the food support unit and to distribute the IR radiation evenly over the radiation side of the food support unit.

17. The radiation grill unit according to claim 16, further comprising a radiation grill unit cavity configured to host a drip tray.

18. The radiation grill unit according to claim 17, wherein the drip tray is configured in the radiation grill unit cavity below the lower portion of the reflector of each radiation unit of the two radiation units and out of a line of sight of direct IR radiation from the IR radiation heater of each radiation unit of the two radiation units, further wherein the drip tray comprises at least one drip tray reservoir configured to store a lipid comprising liquid.

19. The radiation grill unit according to claim 18, further comprising:
a protective window, transmissive for the IR radiation, for each of the two radiation units, wherein each protective window is arranged in front of the reflector opening of a respective radiation unit, between the respective radiation unit and radiation grill unit cavity, each protective window further being at an angle ($\beta$) relative to a normal to a food support surface of the food support unit, with $\beta>0°$, wherein each protective window further comprises a lower edge that is (a) configured above the drip tray face, and (b) horizontally extends within an inner horizontal width dimension of the drip tray face more than an upper edge of the respective protective window.

* * * * *